(12) United States Patent
Dix et al.

(10) Patent No.: US 9,140,345 B2
(45) Date of Patent: Sep. 22, 2015

(54) SYSTEM AND METHOD FOR CONTROLLING A CONTINUOUSLY VARIABLE TRANSMISSION DURING A SHUTTLE SHIFT

(75) Inventors: Peter J. Dix, Naperville, IL (US); Garth H. Bulgrien, Ephrata, PA (US); Pawel Kuros, Wood Dale, IL (US); Rocco Petrigliano, Valsinni (IT)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/240,789

(22) PCT Filed: Jul. 12, 2012

(86) PCT No.: PCT/US2012/046423
§ 371 (c)(1),
(2), (4) Date: Feb. 25, 2014

(87) PCT Pub. No.: WO2013/028276
PCT Pub. Date: Feb. 28, 2013

(65) Prior Publication Data
US 2014/0222304 A1    Aug. 7, 2014

Related U.S. Application Data

(60) Provisional application No. 61/527,455, filed on Aug. 25, 2011.

(51) Int. Cl.
*B60W 30/186* (2012.01)
*F16H 41/24* (2006.01)
(Continued)

(52) U.S. Cl.
CPC .............. *F16H 41/24* (2013.01); *B60W 10/04* (2013.01); *B60W 10/101* (2013.01); *B60W 10/103* (2013.01); *B60W 10/111* (2013.01); *B60W 30/186* (2013.01); *B60W 30/18045* (2013.01); *F16H 47/04* (2013.01); *F16H 61/66* (2013.01); *B60W 2510/0241* (2013.01); *B60W 2510/10* (2013.01); *B60W 2510/104* (2013.01); *B60W 2520/10* (2013.01); *B60W 2720/10* (2013.01); *F16H 2037/0886* (2013.01);
(Continued)

(58) Field of Classification Search
CPC .................................................. F16H 2312/08
See application file for complete search history.

(56) References Cited

U.S. PATENT DOCUMENTS

| | | | |
|---|---|---|---|
| 5,529,546 A * | 6/1996 | Ishino et al. | 475/76 |
| 6,413,189 B1 * | 7/2002 | Spiess et al. | 477/110 |
| 2010/0174456 A1 * | 7/2010 | Beaudoin et al. | 701/51 |

*Primary Examiner* — Ramya Burgess
*Assistant Examiner* — Mark Manley
(74) *Attorney, Agent, or Firm* — Sue C. Watson

(57) ABSTRACT

A method for controlling a continuously variable transmission of a work machine during a shuttle shift is disclosed. The method may generally include initiating a directional swap by disengaging an off-going directional clutch of the continuously variable transmission and slipping an on-coming directional clutch of the continuously variable transmission to decelerate the work machine in an off-going direction. In addition, the method may include estimating a total amount of energy to be dissipated in the on-coming directional clutch during the shuttle shift, comparing the total amount of energy to a predetermined energy threshold and, if the total amount of energy is equal to or exceeds the predetermined energy threshold, performing the reversion action to complete the shuttle shift, wherein the reversion action corresponds to an action taken to engage one of the off-going directional clutch or the on-coming directional clutch so as to permit the shuttle shift to be completed using ratio changing.

5 Claims, 14 Drawing Sheets

(51) Int. Cl.
*B60W 10/103* (2012.01)
*B60W 30/18* (2012.01)
*F16H 61/66* (2006.01)
*F16H 47/04* (2006.01)
*B60W 10/04* (2006.01)
*B60W 10/101* (2012.01)
*B60W 10/111* (2012.01)
*F16H 37/08* (2006.01)
*F16H 59/08* (2006.01)

(52) U.S. Cl.
CPC .. *F16H 2059/088* (2013.01); *F16H 2061/6608* (2013.01); *F16H 2312/08* (2013.01); *Y10T 477/636* (2015.01)

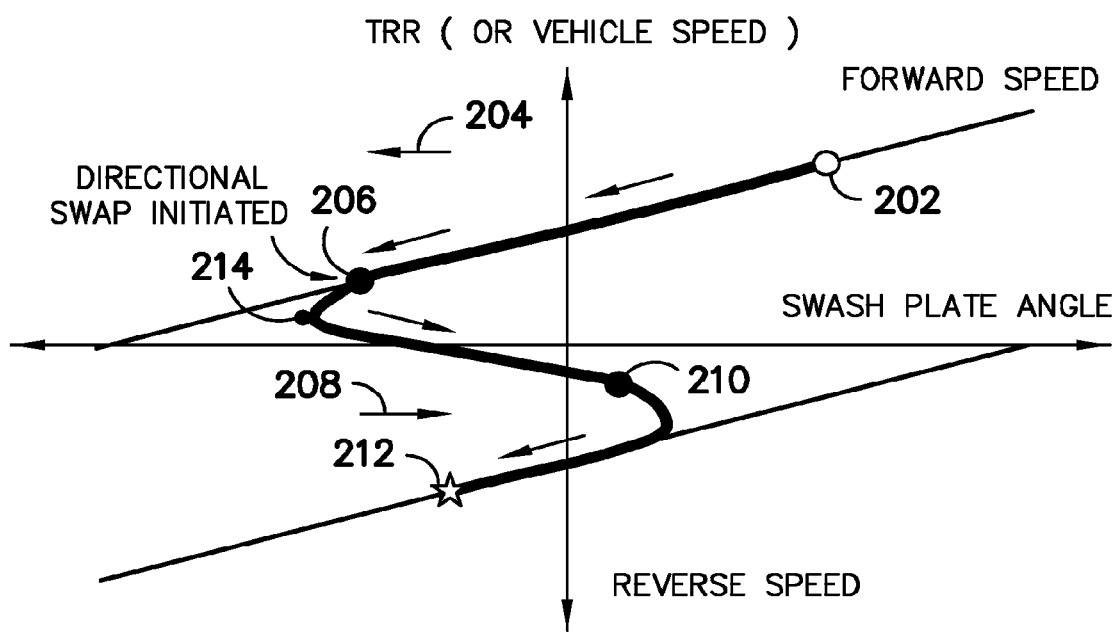
FIG. -11-

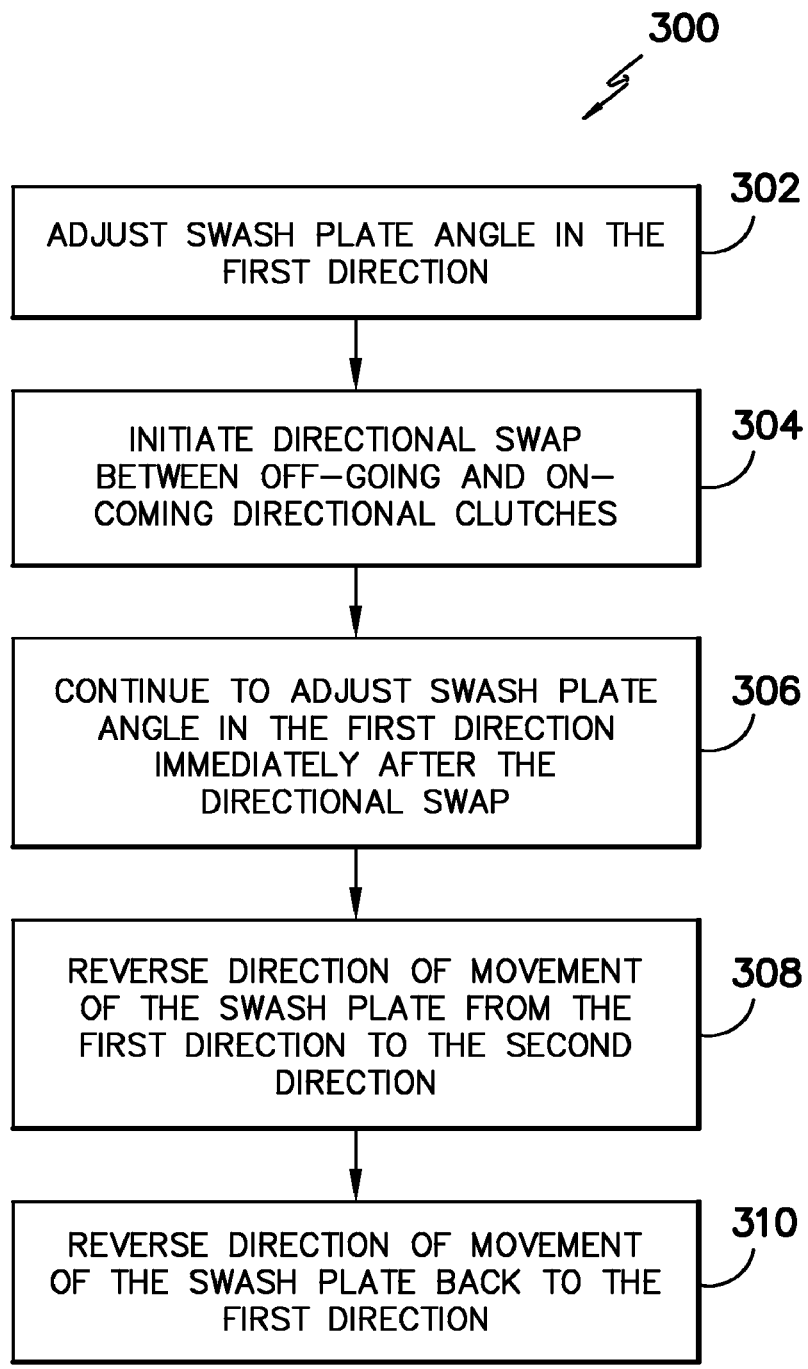
FIG. -12-

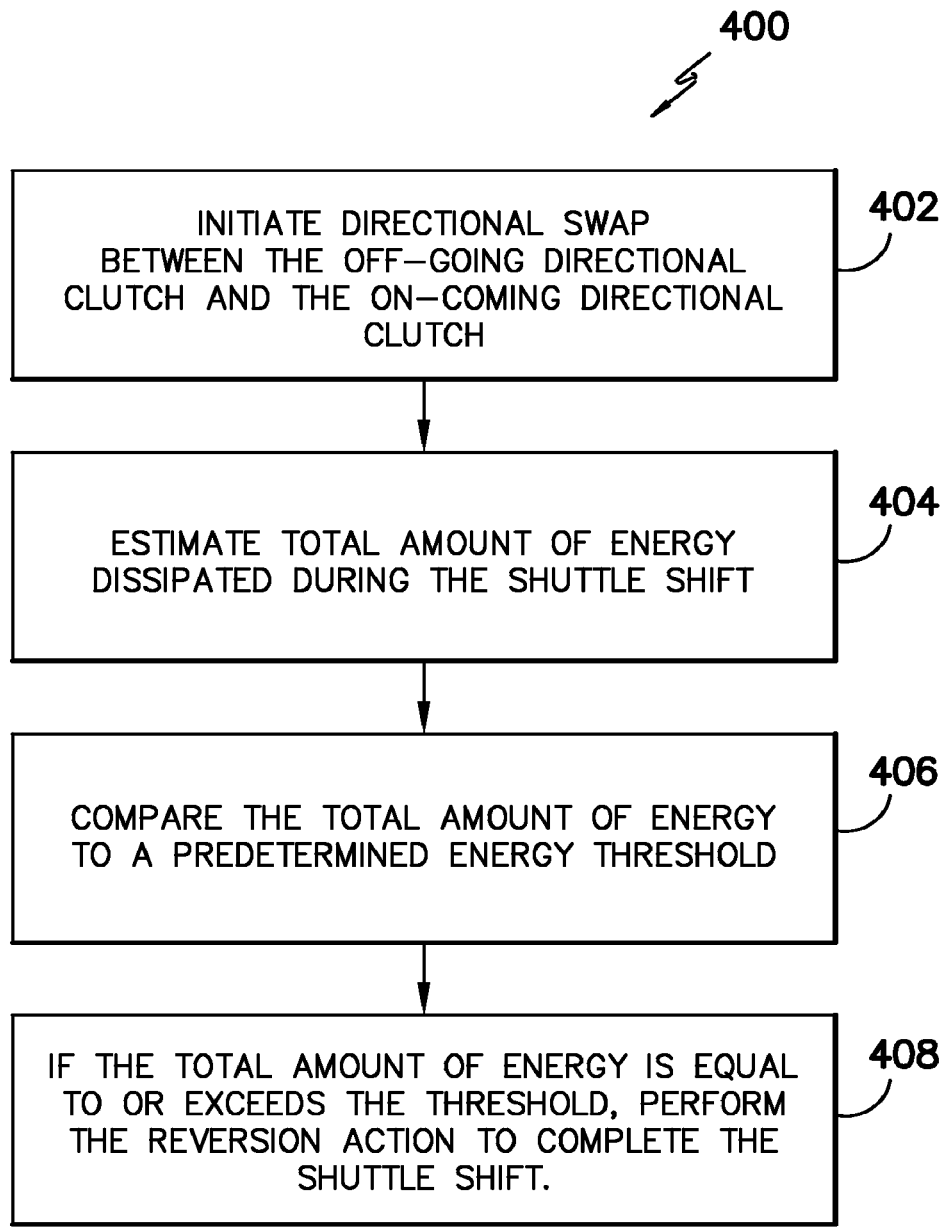
FIG. -13-

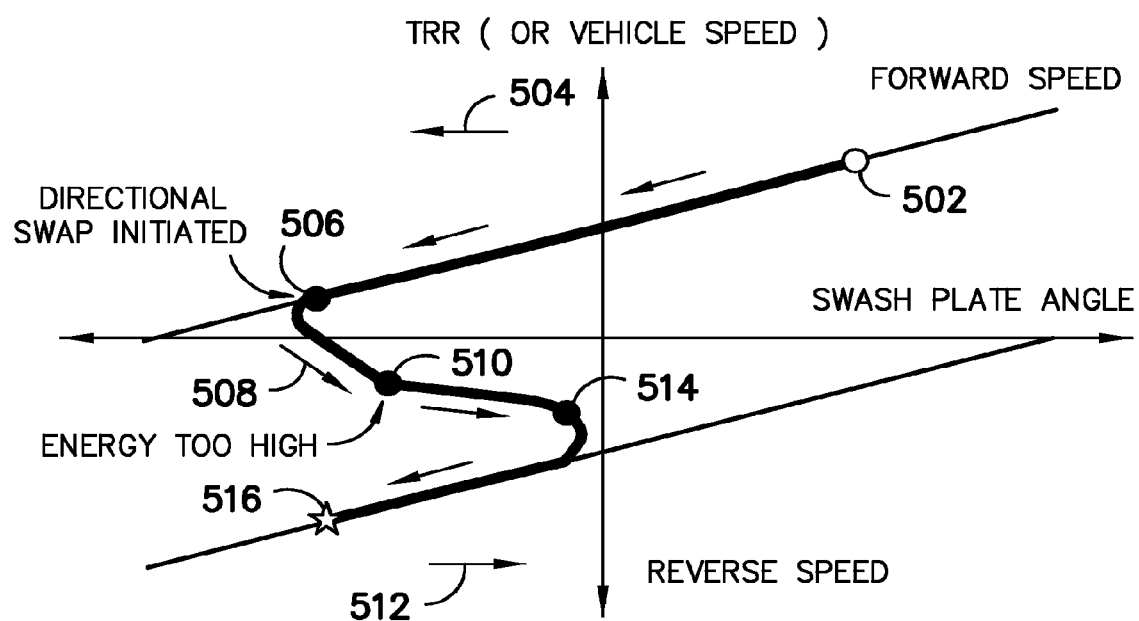
FIG. -14-

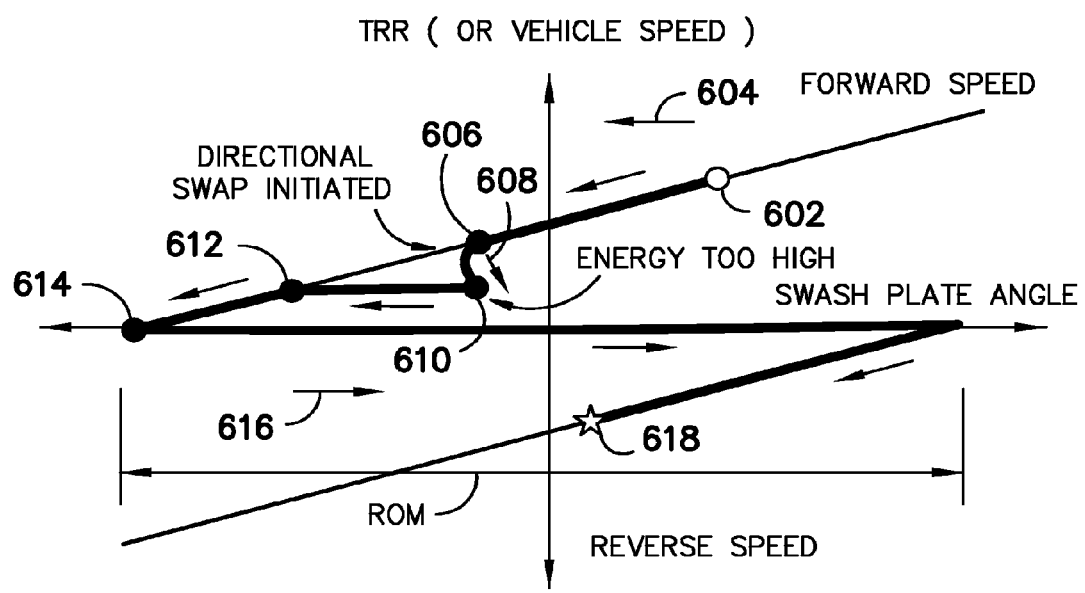
FIG. -15-

SYSTEM AND METHOD FOR CONTROLLING A CONTINUOUSLY VARIABLE TRANSMISSION DURING A SHUTTLE SHIFT

CROSS-REFERENCE TO RELATED APPLICATIONS

This application is based upon and claims priority to U.S. Provisional Patent Application No. 61/527,455, filed on Aug. 25, 2011 and entitled "Shuttle Shifting for a Continuously Variable Transmission, the disclosure of which is hereby incorporated by reference herein in its entirety for all purposes.

FIELD OF THE INVENTION

The present subject matter relates generally to continuously variable transmissions and, more particularly, to a system and methods for controlling a continuously variable transmission in order to provide for improved shuttle shifting.

BACKGROUND OF THE INVENTION

Continuously variable transmissions utilizing a hydrostatic power unit, hereinafter sometimes referred to as hydro-mechanical continuously variable transmissions, are well known. A variety of work machines utilize this type of transmission for industries such as agriculture, earth moving, construction, forestry, and mining. In operation, the fluid displacement of the hydrostatic power unit is varied to change the output to input ratio of the transmission, that is, the ratio between the rotating output of the transmission, and the input. This is accomplished by varying the angle in a swash plate of a variable displacement fluid pump or motor of the hydrostatic unit. In a common mode of operation referred to as a shuttle shift, the direction of movement of the machine is changed, often under load, a common example of which being when a tractor loader moves in one direction to pick or scoop up a load, then lifts the load and reverses direction, often involving a turning movement, and unloads the load. This sequence is then reversed, and is often repeated many times. Sometimes, such shuttle shifting operations are performed on slopes or inclines. Such movements tend to subject elements of the transmission to wear and tear, and can raise the temperature of various elements, particularly clutches, and thus raise performance, longevity and reliability concerns. It is also typically desired for shuttle shifts to be completed relatively quickly and seamlessly, with little or no jerking or lurching of the machine.

In one category of the transmissions, the hydrostatic power unit is configured such that to effect movement of the vehicle in one direction, a swash plate of the unit will be tilted in one direction. To effect vehicle movement in the opposite direction, the swash plate is tilted in the opposite direction. When no vehicle movement is sought, e.g., no forward or rearward motion, the swash plate of the unit is moved to a zero tilt angle or near zero angle. Then, to effect movement of the vehicle in one direction or the other, the swash plate is appropriately tilted in the requisite direction to the requisite angle. In this category of transmission, if multiple speed ranges are provided, zero speed for each range will be the zero or near zero position, which presents no problem or limitation for shuttle shifting to move the vehicle in opposite directions.

However, another category of continuously variable transmissions, commonly used in a variety of heavy vehicles such as work machines, including for construction, earth moving, forestry, and agriculture, wherein shuttle shifting is commonly used, employs a hydrostatic power unit configured such that at zero vehicle or machine speed, the swash plate of the hydrostatic power unit is at full displacement or near full displacement, in one direction or the other, depending on the range selected, direction of travel and possibly other factors. Reference as an example in this regard, Weeramantry, U.S. Pat. No. 7,063,638 B2, issued Jun. 20, 2006. When shuttle shifting this type of transmission, the common practice is to reduce the gear ratio to achieve zero vehicle speed, and then shift the transmission to move the machine in the opposite direction. When zero vehicle speed is reached, some time will be required to move the swash plate to its new position, and during this time the operator can apply a brake or engage a combination of opposing clutches to hold the wheels or tracks. However, a shortcoming of this manner of shifting is that a delay can result as the swash plate is moved. As another possible shortcoming, repeatedly performing shuttle shifts in the same manner can raise temperature related performance and reliability issues, particularly if the brake is repeatedly used to decelerate the vehicle or the same clutch is repeatedly used to decelerate and/or accelerate the vehicle during the shifts. Additionally, not all shuttle shifts are performed under the same conditions, and it can be desirable to have alternative manners of performing a shuttle shift for the different conditions.

Thus, what is sought is a manner of overcoming one or more of the disadvantages or shortcomings, and achieving one or more of the desired characteristics, set forth above.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for controlling a continuously variable transmission of a work machine during a shuttle shift. The method may generally include initiating a directional swap by disengaging an off-going directional clutch of the continuously variable transmission and slipping an on-coming directional clutch of the continuously variable transmission to decelerate the work machine in an off-going direction. In addition, the method may include estimating a total amount of energy to be dissipated in the on-coming directional clutch during the shuttle shift, comparing the total amount of energy to a predetermined energy threshold and, if the total amount of energy is equal to or exceeds the predetermined energy threshold, performing the reversion action to complete the shuttle shift, wherein the reversion action corresponds to an action taken to engage one of the off-going directional clutch or the on-coming directional clutch so as to permit the shuttle shift to be completed using ratio changing.

In another aspect, the present subject matter is directed to a method for controlling a continuously variable transmission of a work machine during a shuttle shift. The method may generally include initiating a directional swap by disengaging an off-going directional clutch of the continuously variable transmission and slipping an on-coming directional clutch of the continuously variable transmission to decelerate the work machine in an off-going direction. In addition, the method may include, determining whether the on-coming directional clutch will be subject to overheating if the on-coming directional clutch continues to be slipped, disengaging the on-coming directional clutch in the event that the on-coming directional clutch will be subject to overheating and moving a swash plate of a hydrostatic unit of the continuously variable transmission to a position for re-engaging the off-going directional clutch.

In a further aspect, the present subject matter is directed to a system for performing a shuttle shift while operating a work machine. The system may generally include a continuously variable transmission having an off-going directional clutch for engaging the continuously variable transmission in an off-going direction and an on-coming directional clutch for engaging the continuously variable transmission in an on-coming direction. In addition, the system may include a controller communicatively coupled to the continuously variable transmission. The controller may be configured to: initiate a directional swap by disengaging the off-going directional clutch and slipping the on-coming directional clutch to decelerate the work machine in the off-going direction, estimate a total amount of energy to be dissipated in the on-coming directional clutch during the shuttle shift, compare the total amount of energy to a predetermined energy threshold and, if the total amount of energy is equal to or exceeds the predetermined energy threshold, perform the reversion action to complete the shuttle shift, wherein the reversion action corresponds to an action taken to engage one of the off-going directional clutch or the on-coming directional clutch so as to permit the shuttle shift to be completed using ratio changing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 11 is a simplified diagrammatic representation of the transmission ratio verses swash plate angle for the transmission of FIG. 2, for yet another selectable manner of shifting the transmission;

FIG. 12 is a flow diagram showing steps of one embodiment of a method for performing a shuttle shift in accordance with the manner of shifting shown in FIG. 11;

FIG. 13 is a flow diagram showing steps of one embodiment of a method for performing a shuttle shift to prevent overheating of the on-coming directional clutch;

FIG. 14 is a simplified diagrammatic representation of the transmission ratio verses swash plate angle for the transmission of FIG. 2, particularly illustrating a manner of shifting in accordance with the method of FIG. 13 when the work machine is currently traveling in the on-coming direction; and FIG. 15 is a simplified diagrammatic representation of the transmission ratio verses swash plate angle for the transmission of FIG. 2, particularly illustrating a manner of shifting in accordance with the method of FIG. 13 when the work machine is currently traveling in the off-going direction.

DETAILED DESCRIPTION OF THE INVENTION

Figure 1:
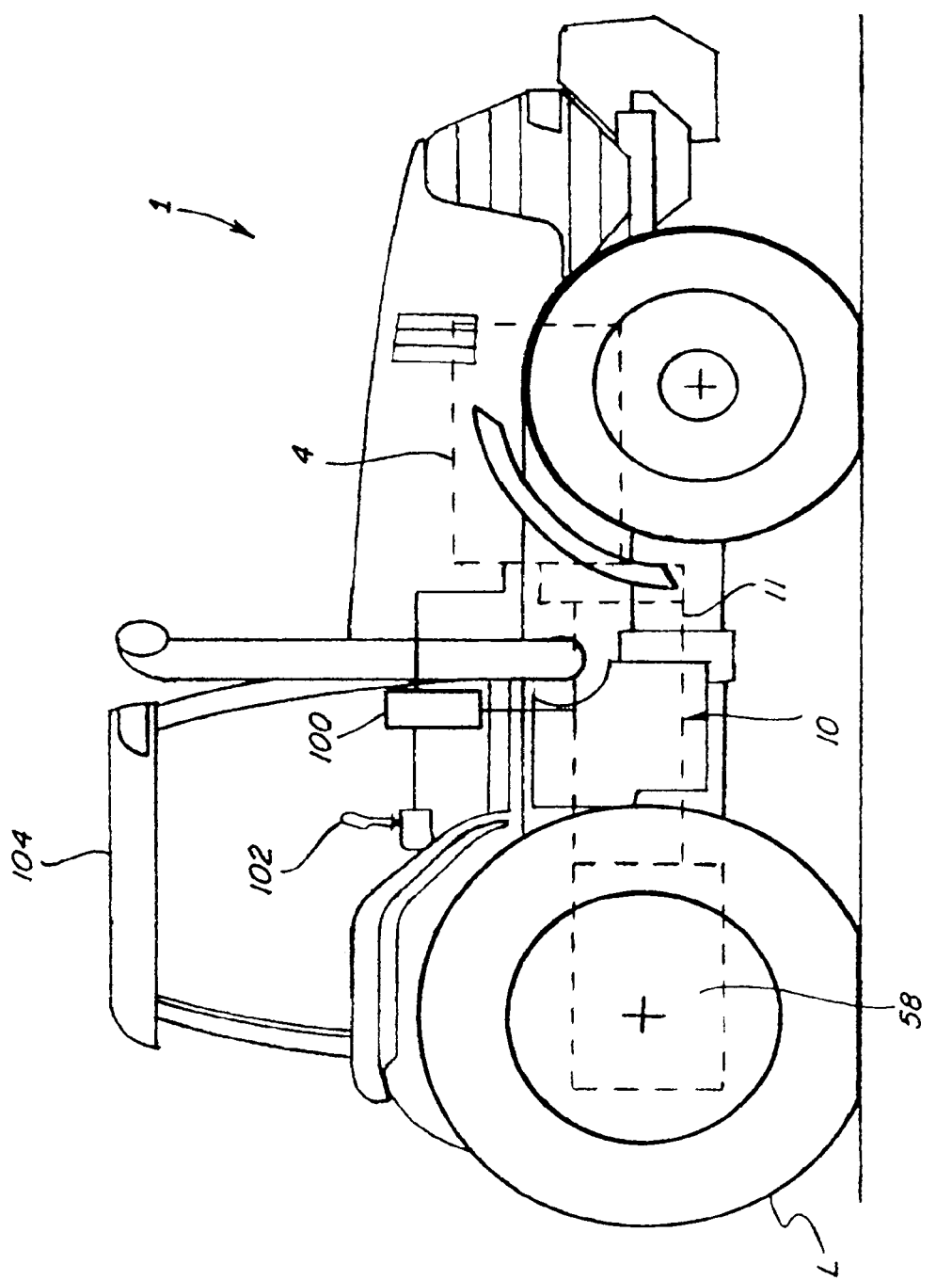
FIG. 1 is a side view of a representative work machine including a continuously variable hydro-mechanical transmission automatically controllable according to the invention for selecting from alternative manners of shuttle shifting and executing the selected shift.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and methods for controlling a continuously variable transmission in such a way so as to protect the on-coming directional clutch from heat damage during shuttle shifting while maintaining the vehicle behavior and performance expected by the operator. As described below, it is often advantageous to perform a shuttle shift by continuously slipping the on-coming directional clutch until the shuttle shift is completed. However, such clutch slipping results in energy being dissipated in the on-coming clutch, thereby generating heat within the clutch. In extreme situations, such as shuttle shifting while going up a hill and/or carrying a heavy load, the amount of heat generated within the on-coming directional clutch can lead to heat damage.

Thus, in accordance with aspects of the present subject matter, the disclosed system and methods provide a means for the controller of work machine to automatically react to situations in which the on-coming directional clutch may be subject to overheating or heat damage. Specifically, as will be described below, a shuttle shift may be initiated by performing a directional swap between the off-going directional clutch and the on-coming directional clutch of the transmission, with the on-coming directional clutch being slipped to provide enhanced performance without requiring the work machine to come to a stop. As the on-coming directional clutch is being slipped, a controller of the work machine may continuously estimate both the amount of energy that has been previously dissipated in the clutch and the amount of energy that will be dissipated in the clutch during the remainder of the shuttle shift. If the total amount of energy that will be dissipated during the shuttle shift is too high, the controller may be configured to "revert" operation of the transmission from clutch slipping back to ratio changing in order to complete the shuttle shift and, thus, prevent overheating of the on-coming directional clutch. In particular, when the amount of energy is too high, the controller may be configured to perform a reversion action to limit further increases in energy dissipation (e.g., by holding the pressure within the on-coming directional clutch or by applying the parking brake to control deceleration of the work machine) while the swash plate is moved to an appropriate position for fully engaging the driveline. Once the driveline is fully engaged, the transmission ratio may be adjusted to complete the shuttle shift.

Referring now to the drawings, in FIG. 1, a representative vehicle in the form of a work machine 1 is shown, which is a tractor representative of those that can be used for a variety of uses, including, but not limited to, agriculture, construction, earth moving and forestry. Work machine 1 includes a power source 4 which will be, for instance, an internal combustion engine, and is mechanically coupled to a continuously variable hydro-mechanical transmission, a representative embodiment 10 of which is shown schematically in FIG. 2. Transmission 10 is automatically operable for selecting from several alternative manners of performing shuttle shifts as a function of one or more monitored conditions, and executing the selected shuttle shift according to the invention, as will be explained.

Figure 2:
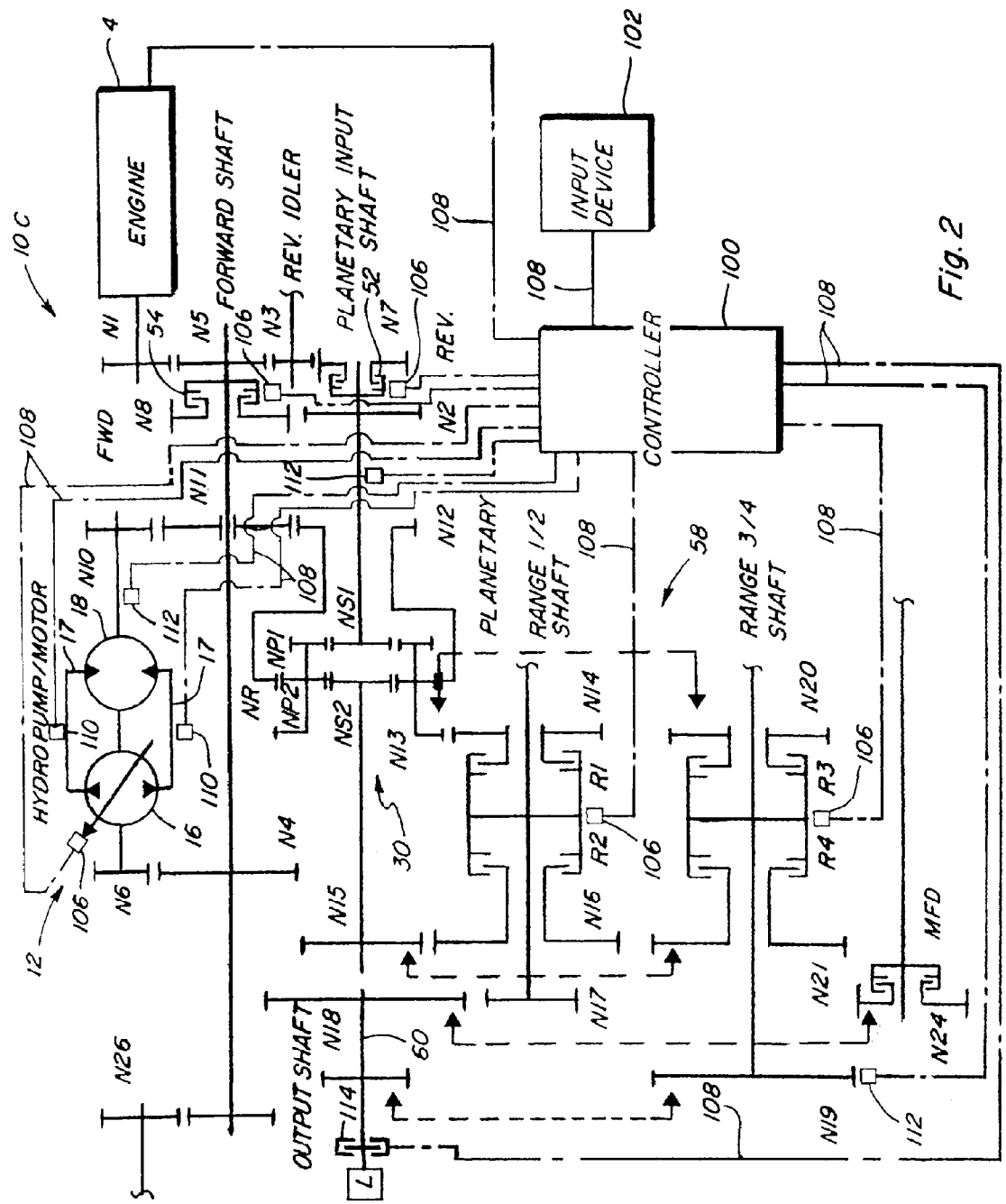
FIG. 2 is a simplified schematic representation of the hydro-mechanical transmission of the work machine of FIG. 1.

Referring also to FIG. 2, transmission 10 is contained in a transmission housing 11 and includes a hydrostatic power unit 12 and a planetary power unit 30 which are coupled to a driveline including a range gear set 58 mounted within transmission housing 11 and coupled to a load L which here is the drive wheels of machine 1 as shown in FIG. 1. It should be understood that machine 1 can alternatively include a load L that comprises a track drive, or an operating system of the machine such as but not limited to, a power take off (PTO).

Hydrostatic power unit 12 of transmission 10 includes a fluid pump 16 coupled by fluid conduits 17 in a closed loop to a fluid motor 18. Motor 18 is coupled to power source 4 via an input gear N6 and having an output gear N10. The power to the hydrostatic power unit 12 is provided by a driven gear N4 mounted on the forward shaft and engaged with gear N6. Output gear N10 is connected to ring gear NR of planetary power unit 30 via gears N11 and N12.

Machine 1 includes a processor based controller 100 in connection with an input device 102 located preferably in operator cab 104 of machine 1, via a suitable communications path 108, to adjust the angle of a swash plate of pump 16 (swash plate denoted by a diagonal arrow through pump 16), through a range of positions. As an exemplary embodiment, pump 16 can be an electronically controlled variable displacement hydraulic pump of well known construction.

Planetary power unit 30 includes a primary sun gear NS1 on a planetary input shaft 32 connectable with power source 4 via a forward directional clutch 54 or a reverse directional clutch 52. Power unit 30 is selectively coupled to the load L, coupled to the hydrostatic power unit 12 and selectively coupled to the power source 4, under automatic control of controller 100. For connection to the load L, the hydro-mechanical transmission 10 includes an output shaft 60 coupled to the load L which carries an input gear N18 engaged with an output gear N17 on a range ½ shaft of range gear set 58, and a gear N22 engaged with a gear N19 on a range ¾ shaft. The range ½ shaft can be coupled to planetary power unit 30 via automatic operation of range selectors or clutches R1 and R2 for power flow through gears N13 and N14, or N15 and N16, respectively. The range ¾ shaft can be coupled to unit 30 via range selectors or clutches R3 and R4 for power flow via gears N13 and N20, or N15 and N21. Range ½ shaft and range ¾ shaft can also be simultaneously coupled to power unit 30, to provide dual power flow.

The control of the various clutches will be automatically controlled by controller 100, using actuators 106 connected to controller 100 via suitable conductive paths 108. Transmission 10 also includes appropriate sensors, including pressure sensors 110 for sensing pressure conditions in conduits 17 connecting pump 16 and motor 18, and speed sensors 112 for sensing speeds of load shaft 60, all connected to controller 100 via conductive paths 108. Controller 100 is also connected to engine 4 for receiving speed and other information therefrom.

In operation, the continuously variable hydro-mechanical transmission 10 can be operated to have a combined hydrostatic and mechanical power flow by engaging the reverse clutch 52 to power planetary power unit 30 via gears N1, N3, N5 and N7, or engaging forward clutch 54 to power it via gears N1, N8, and N2. It is also possible to operate transmission 10 for a pure hydrostatic power flow by disengaging both clutches 52 and 54.

As a result, with transmission 10, there is no selection for a work range or road range per se. However, the transmission provides a seamless transition between ranges to provide work/road configurations as desired. Speed change from zero to maximum speed is achieved in a smooth and continuous manner by changing the swash plate angle of the pump 16 under control of controller 100. For each speed range, substantially the full range of travel of the swash plate is used. That is, the swash plate will be at one end of the range of its travel for zero speed within the range, it will be at the other end for maximum speed in that range, and the zero tilt or neutral position of the swash plate will be an intermediate position for the speed range, not the zero speed position as it is for some other transmissions. This presents a challenge for execution of some transmission commands that require a change of state wherein the swash plate will have to be tilted to a position significantly different from the present position, e.g., some shuttle shifts, as some time for the transition or movement to the new position will be required. For other commands, e.g., shuttle shifts at higher speeds, the speed range will need to be changed, but it can be observed that the required ending swash plate position is the same or similar to the beginning position, which presents an opportunity for shifting in a different manner than that for lower speed shifts.

Transmission 10 includes a parking brake 114 in connection with load shaft 60, which is utilized according to the invention for enabling at least one selectable manner of shuttle shifts. Parking brake 114 is connected to controller 100 via a suitable conductive path 108 for automatic operative control thereby, including to proportionally or gradually engage, and release or disengage, under certain conditions. To achieve this latter capability, as a non-limiting example, parking brake 114 can be controlled using a proportional pressure reducing valve operated by an electrical signal from controller 100. For operation when machine 1 is not operating, parking brake 114 can be engaged by a spring or other biasing element or elements, or by mechanical means.

Other conditions wherein parking brake 114 will be automatically controlled by controller 100 to engage, or remain engaged if already engaged, can include, but are not limited to, when power source 4 of machine 1 is turned off, the transmission is disengaged, the operator leaves the operator seat, and if the FNR lever is left in F for a certain period of time without movement. Controller 100 will also control the parking brake to remain engaged when a command is received to disengage the parking brake, until certain conditions are met, as will be explained. Other conditions include when a command is received via an input device 102, e.g., FNR lever or the like, to change the operating state of the transmission. Such commands can include a change to, or in close proximity to, a neutral or zero movement state, or a clutch command.

It should be appreciated that the work machine 1 shown in FIG. 1 simply illustrates one example of a suitable work machine 1 with which the disclosed system and method may be utilized. Similarly, the configuration of the transmission 10 shown in FIG. 2 simply illustrates one example of a suitable transmission with which the disclosed system and method may be utilized. Thus, one of ordinary skill in the art should appreciate that application of the present subject matter need not be limited to the particular work machine 1 and transmission 10 shown in FIGS. 1 and 2, but, rather, the present subject matter may be advantageously used with various types/configurations of works machines and transmissions.

Figure 3:
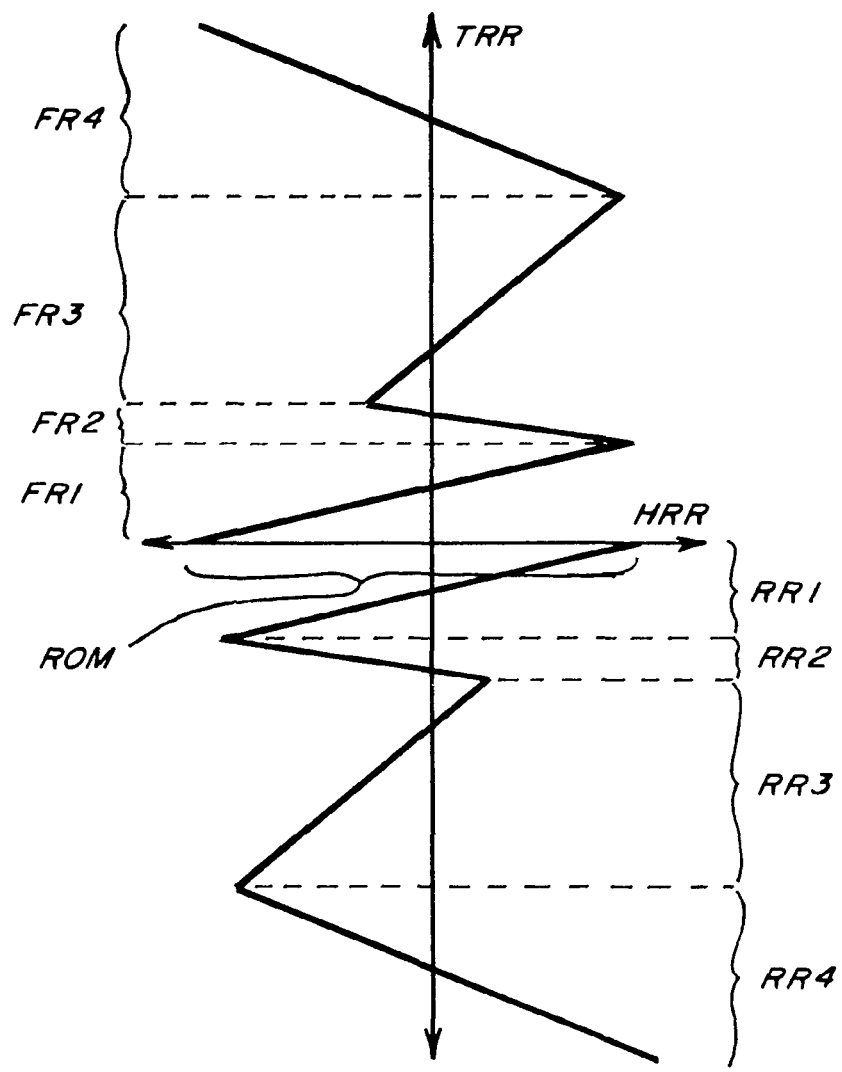
FIG. 3 is a simplified diagrammatic representation of transmission ratio verses hydrostatic power unit ratio for the transmission of FIG. 2.

Referring also to FIG. 3, a graphical representation of the relationship of transmission ratio, denoted TRR, to hydrostatic power unit ratio (motor speed/pump speed) denoted HRR, is shown, for the four selectable forward ranges, and four selectable reverse ranges of operation of transmission 10: namely, forward range 1 or low (denoted FR1); forward range 2 (denoted FR2); forward range (FR3); forward range (FR4); reverse range 1 (RR1); reverse range 2 (RR2); reverse range 3 (RR3); and reverse range 4 (RR4). HRR directly relates to swash plate angle, which is the parameter controlled by controller 100. In FIG. 3, it should be noted that for each of the ranges, the zero tilt position of the swash plate lies between the maximum degrees of tilt in the opposite directions of movement of the swash plate. Thus, at the lowest hydrostatic power unit ratio for forward range RR1, the swash plate will be at or near maximum tilt in the left hand direction as depicted, which is also the zero speed ratio for the transmission for that direction, while at the highest ratio for that range the swash plate will be at or near its maximum tilt in the opposite direction, which is the right hand direction as depicted. It can be noted that for the reverse direction, the opposite is true. Thus, it can also be observed that to go from zero speed in the lowest range in the forward direction to zero speed in the lowest range in the reverse direction, the swash plate must travel substantially its entire range of movement, as depicted by distance ROM. It should also be noted that to engage reverse, not only must the forward and reverse directional clutches 54 and 52 be swapped, but the swash plate must be moved the distance ROM. Here, it should be noted that when referring to the term "maximum" tilt, some marginal amount of swash plate movement should still remain such that zero vehicle speed can still be achieved under conditions such as, but not limited to, leakage in the hydrostatic power unit, that may cause the motor to rotate more slowly for a given swash plate angle.

Additionally, while the swash plate is being moved from one side to the other, generally the driveline cannot be engaged, since this could result in higher speeds if the clutch is not slipped. There are perhaps two main options to deal with this, one is to four square the transmission (lock the output shaft) by applying both the R1 and R3 clutches, and the second is to use the parking brake. If four squaring is used, it is difficult to control, since the swash plate movement is not completely decoupled, and moving the swash plate tends to move the vehicle in the opposite direction, and this must be compensated for by controlling the pressure in either the R3 or R1 clutches.

As an advantage of the present invention, shuttle shifting shall be allowed from any forward speed to any reverse speed. According to the invention, shuttle shifts will have three phases. During the first, machine 1 is decelerated using the swash plate, with the deceleration limited to a target value. Next, the forward and reverse clutches 54, 52 are swapped. Directional swapping is defined as the part of the shuttle shift from when the off-going directional clutch starts to dump to when the on-going clutch is finished ramping up and is fully engaged. The last phase of a shuttle is when the machine may be accelerated using the swash plate to the final speed in the opposite direction. This is done with the swash plate, range shifting as needed, and limited to the desired transmission acceleration value. It should also be noted that deceleration is controlled in all phases of all types of shuttles, during the ratio changing, deceleration with the parking brake, and deceleration then reacceleration using clutch slipping.

As a consideration, it is advisable to minimize energy dissipated by clutches to prevent damage. It has been found that one of the best ways to do this is to reduce the speed of the vehicle prior to the shift. Directional swapping is always done in the first range. If the speed is higher when the shuttle shift is commanded, the vehicle will be slowed by normal swash plate movement and range shifting. As a result, in the invention, both the speed when the shuttle is commanded (or the current speed) and the final opposite speed will be needed to determine when and how to swap the clutches and move the swash plate.

As another consideration, as evidenced by the distance ROM, shuttle shifting for transmissions, such as transmission 10, is challenging because the swash plate may need to move a considerable distance before the on-coming clutch can be engaged, or the vehicle may go too fast before the swash plate reaches its final position. In this case, it has been found that it is best to apply parking brake 114, to keep the vehicle from rolling while in neutral when the swash plate is being moved. As another consideration, since the time to move the swash plate may vary considerably, and engaging the on-coming clutch while the swash plate is not in position can cause overspeed conditions, controller 100 should fill the on-coming clutch, and then wait until the motor speed (swash plate error) has reached it proper value before engaging the on-coming clutch, to achieve consistent shifts. During shuttle shifts, the desired transmission output acceleration (DTOA) is desirably achieved through all phases, and especially needs to be matched during transitions between phases. The pressure in the on-coming clutch should be carefully controlled to achieve the correct DTOA, both through initialization to the proper pressure and closed loop control. If the parking brake is used for decelerations, it is also controlled in a closed loop fashion to achieve DTOA.

Figure 4:
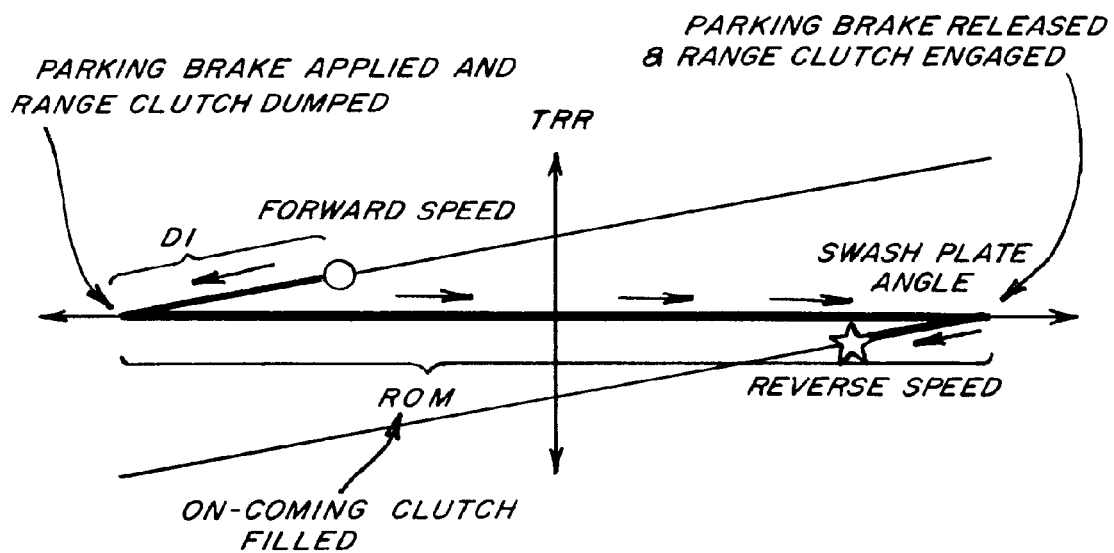
FIG. 4 is a simplified diagrammatic representation of the transmission ratio verses hydrostatic power unit swash plate angle for the transmission of FIG. 2, for one of the selectable manners of shifting the transmission.

Referring also to FIGS. 4 through 9, several manners of shuttle shifting, for different respective conditions, will be explained. In these FIGURES, the vertical axis represents the ratio of the transmission output speed to the engine speed, denoted TRR, and is also representative of the vehicle speed of movement in opposite directions (forward above horizontal axis; reverse below). The horizontal axis represents the swash plate angle of the hydrostatic power unit. In the graphs a forward-to-reverse shuttle shift is depicted, but the description will also apply to a reverse-to-forward shuttle shift for the applicable conditions. In this regard, FIG. 4 depicts a manner of shuttle shifting for a low forward beginning speed, and a low reverse ending speed. This utilizes automatic operation of the parking brake just as the vehicle is brought down to zero speed and the range clutch is dumped.

As a first step, the speed is reduced by moving the swash plate, as denoted by distance D1. In FIG. 4, range shifts are not shown, but if the shuttle shift is commanded from a higher speed range, then the swash plate will be moved and the range shifts will occur just as they do in normal speed changes. Just like normal speed changes, the rate of change of the desired transmission ratio may be limited and adjusted by control software of controller 100.

As the vehicle reaches zero speed, the range clutch is dumped, and parking brake 114 is automatically applied to reduce required operator action, e.g., clutching and application of the service brake, to prevent unwanted movements of the vehicle. The applied pressure of the parking brake should be high enough to keep the vehicle from moving in the wrong direction, even on a steep hill. The swash plate will then be moved over distance ROM to reverse tilt. During movement of the swash plate over distance ROM, the on-coming directional clutch is filled. Then, after the swash plate is moved to the correct position and the on-coming directional clutch is filled, the parking brake will be released or disengaged and the vehicle will begin to move. At a selected time, e.g., at the end of the ROM, the directional swap will occur (on-coming directional clutch is engaged and the off-going directional clutch is dumped), and the swash plate is moved in a manner to achieve the selected reverse speed.

Figure 5:
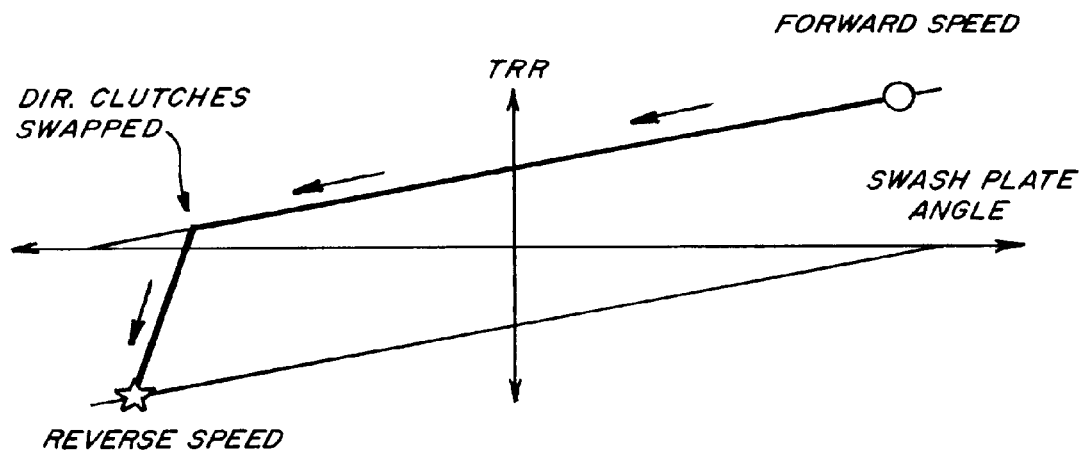
FIG. 5 is a simplified diagrammatic representation of the transmission ratio verses swash plate angle for the transmission of FIG. 2, for another selectable manner of shifting the transmission.
Figure 6:
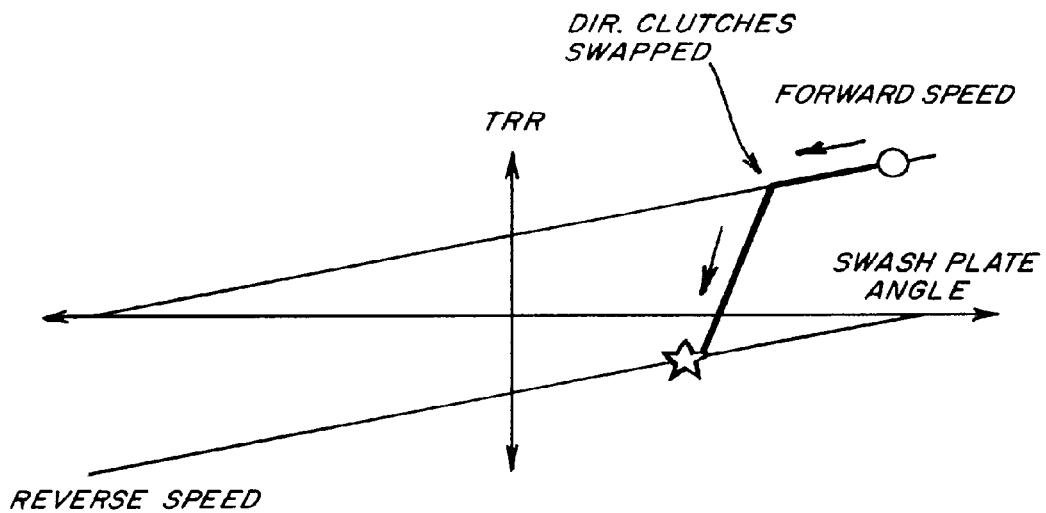
FIG. 6 is a simplified diagrammatic representation of the transmission ratio verses swash plate angle for the transmission of FIG. 2, for another selectable manner of shifting the transmission.

Another manner of shuttle shifting according to the invention is illustrated in FIG. 5 is a constant SPA shuttle shift. This manner is applicable for high speed to high speed shifts, and also high to low and low to high shifts (FIG. 6). Note that this manner of shuttle shift can be utilized at almost any swash plate angle, depending on the final reverse speeded needed. The energy will depend on the squared difference in the speed across the on-coming clutch as it engages. Changing the swash plate angle to slow the vehicle before performing the clutch swap will reduce the energy and probably result in better performance. The energy dissipated will be similar to the case of high speed to high speed shift. In FIG. 5, range shifts are not shown, but if the shuttle shift is commanded from a higher speed range, the swash plate will be moved and the range shifts will occur just as they do in normal speed changes.

Next, when the transmission ratio is at a given point, the directional clutches are swapped and the swash plate is moved to a value for a particular transmission ratio in the opposite direction. The on-coming directional clutch is filled in anticipation of this point. This swap may be initiated such that the swash plate angle either continues change in the same direction slightly, is held constant during the swap, or actually reverses direction during the swap, depending on the relative values of the various parameters. Reversing the direction of the swash plate angle during the swap can result in less energy being dissipated in the clutch, which is desirable, but if the swash plate control is sluggish compared with the time needed for the swap, it may be better to have some movement of the swash plate in the same direction during the swap. Perhaps more importantly, moving the swash plate during the swap creates a reaction torque that affects the deceleration, so consistent decelerations are easier to achieve if the swash plate movement is minimized. However, as will be described below with reference to FIGS. 11 and 12, it may be desirable in many instances to move the swash plate during the swap (e.g., by reversing the direction of the swash plate during the directional swap). In such instances, steps may be taken to control or minimize the reaction torque created as a result of any swash plate angle adjustments occurring during the directional swap.

FIG. 6 illustrates a high to low speed shuttle shift in the just described manner. This illustrates that shuttles that don't require the swash plate to move back in the opposite directional don't necessarily need to be high speed to high speed ones. The shift occurs at speeds higher than for the high to high speed shift, since the reverse speed is slower. Note that these types of shifts can occur at most any swash plate angle, depending on the final reverse speeded needed. The energy will depend on the squared difference in the speed across the on-coming clutch as it engages.

Medium speed shuttle shifts are ones where generally there is enough time to move the swash plate into position before the vehicle comes to a stop, although this may not always be the case. The proper time to switch between the shuttle shift strategy using the parking brake to decelerate described here and the shuttle shift using ratio control strategy described above can be determined by which feels better in testing.

Figure 7:
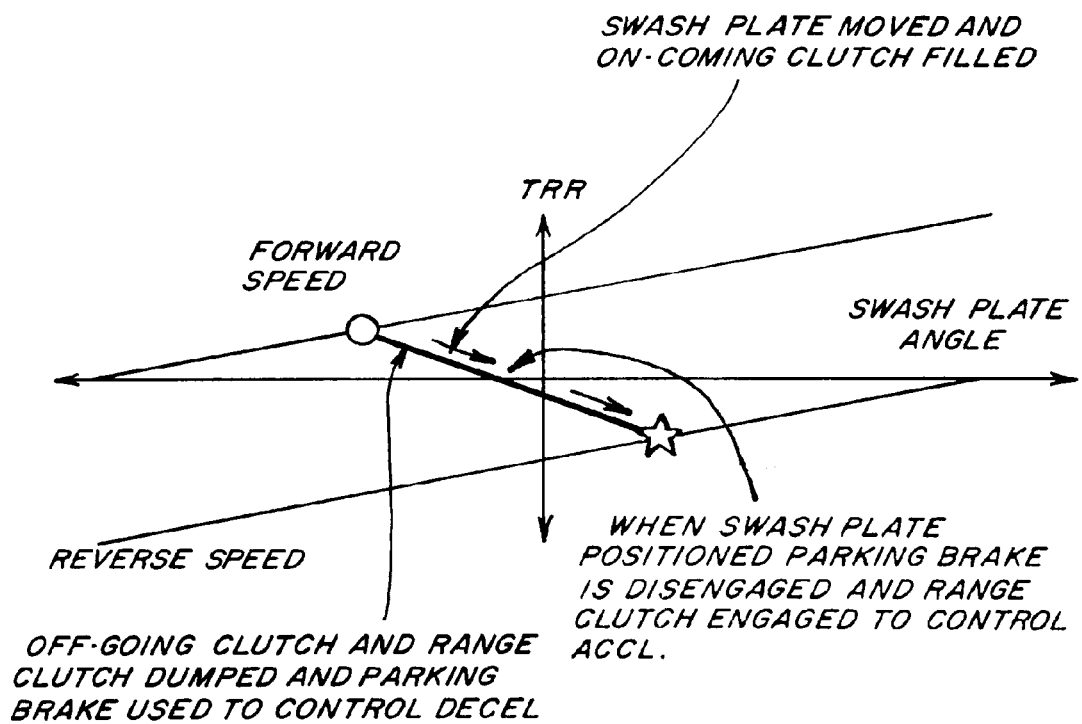
FIG. 7 is a simplified diagrammatic representation of the transmission ratio verses swash plate angle for the transmission of FIG. 2, for still another selectable manner of shifting the transmission.
Figure 8:
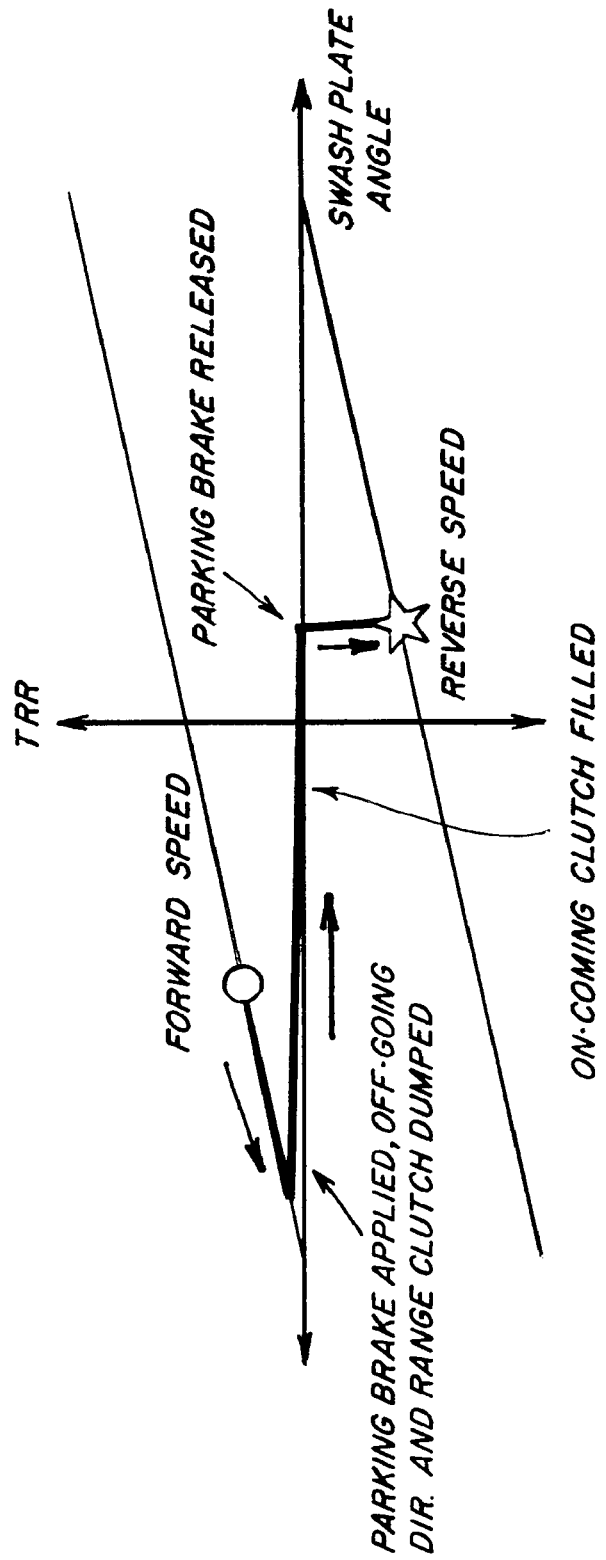
FIG. 8 is a simplified diagrammatic representation of the transmission ratio verses swash plate angle for the transmission of FIG. 2, for still another selectable manner of shifting the transmission.
Figure 9:
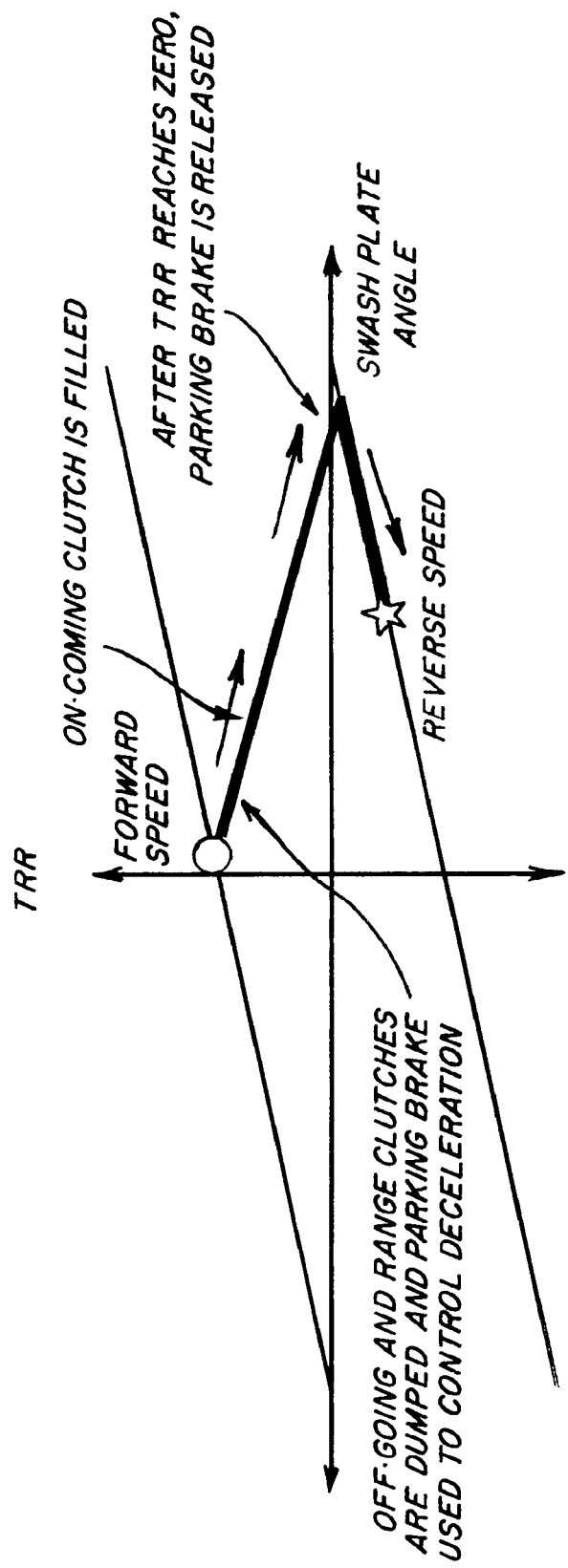
FIG. 9 is a simplified diagrammatic representation of the transmission ratio verses swash plate angle for the transmission of FIG. 2, for still another selectable manner of shifting the transmission.

As illustrated in FIG. 7, when the shuttle shift using the parking brake to decelerate is initiated, there will be a slight delay as the parking brake is prepared to be applied (this cannot be done in advance, since there is no ratio changing before the swap). The off-going clutch is dumped, since the range swap must be performed, but the range clutch also must be dumped to decouple the planetary from the wheels and avoid any torque from moving the swash plate affecting the deceleration. The parking brake is then used to decelerate the vehicle while the swash plate is moved into position and the on-coming clutch is engaged. Engaging the on-coming clutch does not affect the output torque, since the range clutch remains disengaged. Generally, the swash plate is in position before zero speed is reached (since lower speed shuttles don't use this method), and the vehicle will not stop at zero, but this may not be the case if the swash plate movement is slower than normal. As soon as the swash plate is in position, the on-coming clutch is used to continue the deceleration to zero and reaccelerate in the opposite direction.

Shuttle shifts may also comprise combinations of the types described above, as illustrated in FIGS. 8 and 9. Shifts may use the parking brake to decelerate to zero, then use the ratio changing to reaccelerate, if the final speed needed is low. Similarly, if the initial speed is low, a shuttle shift may use ratio changing to slow the vehicle to zero, then engage the range clutch to take off to a higher speed. The exact speed at which the controller change approaches from the shuttle shift method using the parking brake to decelerate and the method using ratio control is determined by tuning or experimentation, and as the shuttle shifts using the parking brake to decelerate are improved (perhaps through faster swash plate movement), the speed may be lowered. At some point, the ratio changing is smoother than deceleration with the parking brake. Generally it is not as smooth to let the vehicle actually come to a stop with the shuttle shift method using the parking brake to decelerate.

If the directional clutches, range clutches or parking brake are too hot, e.g., according to a sensed temperature value or values, or an estimate of the temperature based on the history of clutch pressures and worst case assumptions on the clutches, then controller 100 can inhibit the shuttle logic directional swap, and use ratio changing to bring the vehicle to a stop. If the ratio changing is not effective, there will not be a timeout, the system will continue to wait for the vehicle to slow down, then complete the shuttle.

If the directional swap is in progress and the clutches become too hot (perhaps more typical than starting hot), then a "reverting" logic is used. This includes setting the desired transmission ratio to the current transmission ratio, so the swash plate will be moved to what is needed for re-engaging. Note that the clutches are simply re-engaged and the direction swap is over, regardless of the transmission ratio, or hydrostatic power system ratio. The swash plate will then be moved to reduce the transmission ratio to zero, and then the angle reversed, and then positioned for the target speed in the new direction. Such "reverting" logic will be described in more detail below with references to FIGS. 13-15.

It should be noted that if an operator commands a shuttle shift, and the vehicle does not slow down fast enough, or does not slow at all, such as when pulling a trailer down a hill, it is advisable and normal for the operator to use the service brakes (typically brake pedals on the floor of the operator cab). The service brakes can always be used during shuttle shifts to increase deceleration.

Figure 10:
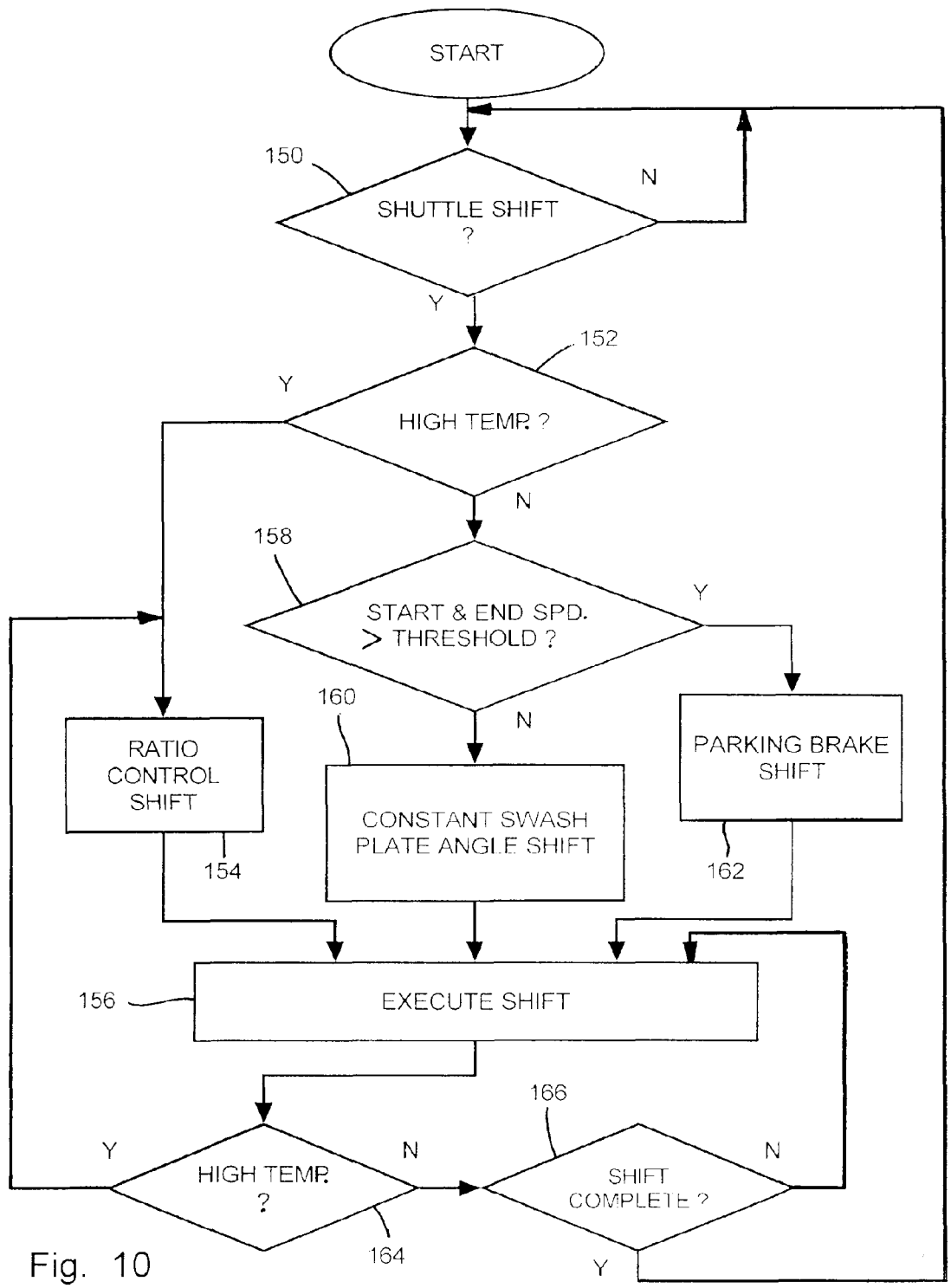
FIG. 10 is a high level flow diagram showing steps of a method of the invention for automatically selecting a manner of shuttle shifting according to the invention.

Referring also to FIG. 10, a high level flow diagram of steps of a method of the invention for controlling shuttle shifts is shown. In the diagram, once the commands for a shuttle shift are received, as denoted in block 150, it is determined whether a high temperature condition exists in the parking brake or clutches, as denoted at block 152. If yes, a ratio controlled shift is selected, as denoted at block 154, and the shift is executed, as denoted at block 156. If at block 152 no high temperature condition is present, it will be determined if at least one of the start and end speeds are greater than thresholds, a high to high, high to low, or low to high speed shift, as denoted at block 158. If yes, a constant SPA shuttle shift is utilized, as illustrated in FIGS. 5 and 6, and denoted at block 160, and the shift executed. If at block 158 at least one of the speeds is not above the threshold values, a shuttle shift using the parking brake to decelerate will be utilized, as denoted at block 162 and illustrated in FIGS. 4 and 7, and the shift executed as denoted at block 156. This can be a shuttle shift using ratio control or a shuttle shift using the parking brake to decelerate. If, during execution of the shift, a high temperature condition is detected, as denoted at decision block 164, the shift in process will be converted to a ratio control shift (if not already that type), as denoted at block 154, execution will proceed in that manner. When the shift is complete, the logic will return to block 150, as denoted by decision block 166.

Referring now to FIG. 11, another manner of shuttle shifting that may be applicable for high speed to high speed shifts (FIG. 5) and also high to low and low to high shifts (FIG. 6) is illustrated in accordance with aspects of the present subject matter. However, unlike the manner of operation shown in FIGS. 5 and 6 in which the swash plate angle is held constant, the illustrated shuttle shift requires that the angle of the swash plate be adjusted during the directional swap. Specifically, as shown in FIG. 11, the direction of movement of the swash plate may be reversed after the initiation of the directional swap in order to reduce the speed differential across the on-coming directional clutch, thereby allowing for the amount of energy dissipated in the on-coming directional clutch to be reduced.

Initially, the shuttle shift may be performed similarly to the shuttle shifts shown above in FIGS. 5 and 6. Specifically, after receipt of a shuttle shift command (indicated by point 202 in FIG. 11), e.g., by receiving an operator input from input device 102 (FIG. 2), the TRR or vehicle speed of the work machine 1 may be reduced by moving the swash plate and making any required range/ratio shifts. For example, as shown in FIG. 11, the swash plate angle may be adjusted in a first direction (indicated by arrow 204 in FIG. 11) to reduce the vehicle speed of the work machine 1. Such deceleration of the work machine 1 may generally allow for a reduction in the energy dissipated in the directional clutches during the directional swap.

In addition, while the swash plate angle is being adjusted, the on-coming directional clutch may be filled in anticipation of the directional swap. For instance, in the illustrated embodiment, a forward-to-reverse shuttle shift is being performed and, thus, the reverse directional clutch 52 (FIG. 2) may be pre-filled with hydraulic fluid while the swash plate angle is being adjusted. As such, the reverse directional clutch 52 may begin to be gradually engaged when the TRR reaches the point at which the directional swap is initiated (indicated by point 206 in FIG. 11).

It should be appreciated that, since FIG. 11 illustrates a forward-to-reverse shuttle shift, the first direction 204 corresponds to a right-to-left (or positive-to-negative) adjustment of the swash plate angle, which, as shown in FIG. 3, provides for a reduction of the TRR or vehicle speed in forward range 1 (denoted FR1). However, in a reverse-to-forward shuttle shift, the first direction 204 may correspond to a left-to-right (or negative-to-positive) adjustment of the swash plate angle, which, as shown in FIG. 3, provides for a reduction of the TRR or vehicle speed in reverse range 1 (denoted RR1).

It should also be appreciated that a variety of different factors may be used to determine the point 206 at which the directional swap may be initiated. For example, when performing the shuttle shift shown in FIG. 11, the TRR must be within a predetermined range (e.g., from about 0.15 to about 0.1) before the directional swap may be initiated. However, when performing the shuttle shift shown in FIG. 4, the TRR may be within a different range (e.g., less than about 0.02) before the directional swap may be initiated. In addition, the pressure within the on-coming directional clutch must be increased a sufficient amount so that the clutch can respond quickly and accurately to the control signals initiating the swap. Moreover, various other operating conditions of the work machine 1 may also be checked to ensure that the directional swap may be initiated, such as that the off-going directional clutch is actually engaged prior to the swap and that there are no faults within the control logic.

Once the TRR reaches point 206, the directional swap is initiated. Specifically, at point 206, the off-going directional clutch (e.g., forward directional clutch 54) may be immediately dumped or disengaged. In addition, the on-coming directional clutch (e.g., reverse directional clutch 52) may be gradually engaged. For instance, the pressure of the hydraulic fluid supplied to the on-coming directional clutch may be gradually increased such that the on-coming directional clutch is partially engaged (i.e., slipping) as the off-going directional clutch is disengaged. As will be described below, the hydraulic pressure within the on-coming directional clutch may continue to be gradually increased as the swash plate angle is adjusted until the on-coming directional clutch is fully engaged (i.e., such that no slippage occurs across the on-coming directional clutch).

It should be appreciated that, as shown in FIG. 11, the directional swap may be initiated while the work machine 1 is still traveling in the off-going direction (e.g., the forward direction). Thus, the off-going directional clutch may be disengaged and the on-coming directional clutch may begin to be engaged prior to the work machine 1 stopping or otherwise reversing its travel direction. By initiating the directional swap while the work machine is still traveling in the off-going direction, the shuttle shift may be performed without stopping or temporarily pausing the work machine 1 at zero speed.

Additionally, after the directional swap is initiated, the direction in which the swash plate angle is being adjusted may be reversed. Specifically, as shown in FIG. 11, the swash plate angle may be adjusted in a second, opposite direction (indicated by arrow 208) as the travel direction of the work machine 1 shifts from the off-going direction (e.g., the forward direction) to the on-coming direction (e.g., the reverse direction). Such reversing of the swash plate may generally allow for the speed differential across the on-coming directional clutch to be reduced, thereby reducing the amount of energy dissipated in the on-coming clutch during the shuttle shift.

As the slippage across the on-coming directional clutch gets low, the movement of the swash plate may be slowed and subsequently reversed. Specifically, as shown in FIG. 11, the swash plate angle may be adjusted in the second direction 208 until the amount of slippage across the on-coming directional clutch falls below a predetermined slip threshold (indicted by point 210). At this point 210, the rate of change of the swash plate angle may be slowed and eventually stopped to allow the direction of movement of the swash plate to be reversed from the second direction 208 back to the first direction 204. As such, when the slippage across the on-coming directional clutch goes to zero (i.e., when the on-coming directional clutch is fully engaged), the swash plate may be moving in the appropriate direction and at the appropriate rate to allow for a seamless transition. The swash plate may then be moved in the first direction and any necessary range/ratio changes may be made to accelerate the work machine to the desired final speed (indicated by point 212.

It should be appreciated that the predetermined slip threshold may generally be determined based on the actual or expected rate at which the slippage across the on-coming directional clutch may be reduced and/or the actual or expected rate at which the swash plate angle may be adjusted. Specifically, as indicated above, it may be desirable for the movement of the swash plate to be completely reversed by the time the on-coming directional clutch is fully engaged. Thus, the predetermined slip threshold may be selected such that sufficient time is provided for reversing the direction of movement of the swash plate prior to the slippage across the on-coming directional clutch being reduced to zero.

Additionally, as indicated above, although reversing the direction of the swash plate provides for a reduction in the energy dissipated in the on-coming directional clutch, such movement of the swash plate also results in a reaction torque. In particular, moving the swash plate while both the driveline and the on-coming directional clutch are engaged generates a reaction torque that adds to the torque transmitted through the on-coming clutch, which can cause a reduction in the deceleration of the work machine 1. However, in several embodiments, the effect of the reaction torque may be mitigated by carefully regulating the hydraulic pressure within the on-coming directional clutch as the movement of the swash plate reverses direction (e.g., from point 206 to a point at which the swash plate is moving in the second direction 208 at a steady speed). In one embodiment, the pressure within the on-coming directional clutch may be controlled as a function of a rate of change of the transmission ratio (denoted TRR) of the transmission 10. For instance, the rate of change of TRR may be continuously monitored and compared to a target deceleration for the transmission 10. The target deceleration may generally correspond to a control setting for limiting the deceleration rate of the transmission 10 during shuttle shifting and may be controlled by a number of factors including, but not limited to, a user setting for "aggressiveness" (low, medium and high). If the rate of change of TRR varies from the target deceleration, the pressure within the on-coming directional clutch may be adjusted until the target deceleration is achieved.

In addition, the reaction torque may also be counteracted by delaying the movement of the swash plate in the second direction 208 until the pressure in the on-coming directional clutch is increased (e.g., by continuing to adjust to the swash plate angle in the first direction 204 for a period of time after the initiation of the directional swap). Specifically, as shown in FIG. 11, at the point at which the off-going directional clutch is disengaged and the on-coming directional clutch begins to be engaged, the rate of change of the swash plate angle in the first direction 204 may be slowly reduced until the motion of the swash plate is momentarily stopped (indicated by point 214 in FIG. 11). This controlled reduction in the rate of change of the swash plate angle in the first direction 204 may generally allow for the hydraulic pressure within the on-coming directional clutch to be ramped up a significant amount prior to reversing the direction of the swash plate, thereby counteracting the reaction torque generated during the shuttle shift. Thereafter, the reaction torque may be controlled by controlling the rate of change of the swash plate angle in the second direction 208 (e.g., as a function of a rate of change of the TRR).

Referring now to FIG. 12, a simplified flow diagram of one embodiment of a method 300 for performing the shuttle shift described above with reference to FIG. 11 is illustrated in accordance with aspects of the present subject matter. As shown, in 302, the swash plate angle may be adjusted in a first direction. For example, as indicated above, the swash plate angle may be adjusted in the first direction 204 in order to reduce the speed of the work machine 1 in the off-going direction. Additionally, in 304, a directional swap may be initiated between the off-going and on-coming directional clutches. Specifically, the off-going directional clutch may be disengaged while the on-coming directional clutch may be gradually engaged. Moreover, in 306, the swash plate angle may continue to be adjusted in the first direction 204 immediately after the initiation of the directional swap. For instance, as indicated above, the swash plate angle may be temporarily moved in the first direction 204 after the initiation of the directional swap to control the reaction torque generated during the shuttle shift. Further, in 308, the direction of movement of the swash plate may be reversed from the first direction 204 to the second direction 208. In doing so, the speed differential across the on-coming directional clutch may be reduced, thereby reducing the amount of energy dissipated in the on-coming directional clutch during the shuttle shift. In addition, in 310, the direction of movement of the swash plate may be reversed back to the first direction 204. Specifically, as indicated above, the movement of the swash plate may be reversed after the amount of slippage across the on-coming directional clutch falls below a predetermined slip threshold, thereby allowing the swash plate to be moving in the appropriate direction and at the appropriate rate when the on-coming directional clutch is fully engaged.

It should be appreciated that the various method elements or steps of the disclosed method 300 may generally be implemented by the controller 100 of the work machine 1. As indicated above, the controller 100 may generally comprise a processor-based device. Thus, in several embodiments, the controller 100 may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the controller 100 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 100 to perform various computer-implemented functions.

Referring now to FIG. 13, a flow diagram of one embodiment of a method 400 for controlling a continuously variable transmission 10 is illustrated in accordance with aspects of the present matter. In particular, the method provides "reverting" logic that may be used to complete a shuttle shift when the amount of energy to be dissipated in the on-coming clutch (i.e., the heat generated in the on-coming clutch) may cause overheating or heat damage to the clutch if the shuttle shift is completed normally (i.e., using clutch slipping).

As shown in FIG. 13, in 402, a directional swap may be initiated between the off-going directional clutch and the on-coming directional clutch of the transmission 10. In particular, the off-going directional clutch may be disengaged while the on-coming directional clutch is slipped as it is gradually engaged. Additionally, in 404, the total amount of energy that will be dissipated in the on-coming directional clutch during the shuttle shift may be estimated. For example, in several embodiments, the total amount of energy may be estimated by assuming that a reversion action will be performed to complete the shuttle shift. As will be described below, the reversion action may correspond to an action taken to inhibit further increases in energy dissipation while the driveline of the transmission is re-engaged (i.e., by fully engaging the off-going directional clutch or the on-coming directional clutch. For instance, the reversion action may include applying the park brake 114 of the transmission 10 while the swash plate is moved to a position for fully engaging the off-going directional clutch. Alternatively, the reversion action may comprise holding the pressure of the hydraulic fluid within the on-coming directional clutch constant while the swash plate is moved to a position for fully engaging the on-coming directional clutch. In other embodiments, the total amount of energy may be estimated by assuming that the shuttle shift is completed normally (i.e., without performing a reversion action).

Moreover, in 406, the total amount of energy estimated in 404 may be compared to a predetermined energy threshold stored within the controller 100 of the work machine 1. If the total amount of energy is less than the predetermined energy threshold, the shuttle shift may be completed normally (i.e., by continuing to slip the on-coming direction clutch). However, if the total amount of energy is equal to or exceeds the predetermined energy threshold, in 408, the reversion action may be performed in order to complete shuttle shift. In other words, if the amount of energy required to complete the shuttle shift using clutch slipping is too high, the controller 100 may take appropriate action to re-engage the transmission 10 to allow the shuttle shift to be completed by adjusting the transmission ratio.

Thus, the disclosed method 400 may be utilized to protect the on-coming directional clutch from overheating or heat damage in situations in which the amount of energy dissipated in the clutch will be excessive. However, in doing so, the exact methodology for protecting the on-coming directional clutch may generally vary depending on whether the work machine 1 is currently traveling in the on-coming direction or the off-going direction. Specifically, the reversion action performed by the controller 100 may vary depending on whether the on-coming directional clutch or the off-going directional will need to be engaged. As such, the disclosed method 400 will be described below with reference to FIG. 14 in regard to performing the reversion action when the work machine 1 has already reversed its direction (i.e., is traveling in the on-coming direction). In addition, the disclosed method 400 will be described below with reference to FIG. 15 in regard to performing the reversion action when the work machine 1 is still traveling in the off-going direction.

As shown in FIG. 14, the shuttle shift may be initiated the same as or similar to the shuttle shifts described above with reference to FIGS. 4-9 and 11. Specifically, after receipt of a shuttle shift command (indicated by point 502 in FIG. 14), the TRR or vehicle speed of the work machine 1 may be reduced by moving the swash plate and making any required range/ratio changes. For example, as shown in FIG. 14, the swash plate angle may be adjusted in a first direction (indicated by arrow 504 in FIG. 14) to reduce the vehicle speed of the work machine 1. Additionally, as described above, the on-coming directional clutch may be pre-filled with hydraulic fluid while the swash plate angle is being adjusted so that the clutch may begin to be gradually engaged or slipped when the TRR reaches the point at which the directional swap is initiated (indicated by point 506 in FIG. 14).

Once the TRR reaches point 506, the directional swap is initiated. For instance, at point 506, the off-going directional clutch (e.g., forward directional clutch 54) may be immediately dumped or disengaged. In addition, the on-coming directional clutch (e.g., reverse directional clutch 52) may be gradually engaged. In particular, the pressure of the hydraulic fluid supplied to the on-coming directional clutch may be gradually increased such that the clutch slips, thereby allowing the clutch to decelerate the work machine 1 in the off-going direction and eventually reverse the direction of the work machine 1 to the on-coming direction (indicated by arrow 508 in FIG. 14). However, such slippage of the on-coming directional clutch also results in a significant amount of energy being dissipated in the clutch, thereby exposing the clutch to overheating or heat damage.

Thus, to ensure that the shuttle shift may be performed without damaging the on-coming directional clutch, the controller 100 of the work machine 1 may be configured to estimate the total amount of energy that will be dissipated in the clutch during the shuttle shift. In several embodiments, this total amount of energy may be calculated using the following Equation (1):

$$E_{Total} = E_{Dissipated} + E_{Additional} \quad (1)$$

wherein, $E_{Total}$ (in Joules) corresponds to the total amount of energy, $E_{Dissipated}$ (in Joules) corresponds to the amount of energy that has been previously dissipated in the on-coming directional clutch since the initiation of the directional swap and $E_{Additional}$ (in Joules) corresponds to the additional amount of energy that will be dissipated in the on-coming directional clutch during the remainder of the shuttle shift (e.g., the energy dissipated by performing an appropriate reversion action or the energy dissipated by completing the shuttle shift normally). Such calculations of $E_{Total}$ may be performed at any suitable frequency during the shuttle shift (e.g., every 10 milliseconds).

By continuously calculating $E_{Total}$ during the shuttle shift, the controller 100 may be configured to estimate the likelihood that damage may occur to the on-coming directional clutch as the shift progresses. Specifically, as indicated above, the controller 100 may be configured to compare each calculated value of $E_{Total}$ to a predetermined energy threshold. If $E_{Total}$ is less than the predetermined energy threshold, the shuttle shift may continue to be performed in the normal manner prescribed for such shuttle shift (e.g., by performing the shuttle shift in accordance with one of the methods shown in FIGS. 4-9 and 11). However, if $E_{Total}$ is equal to exceeds the predetermined energy threshold, an appropriate reversion action may be performed to revert the manner of operation of the transmission 10 back to ratio changing.

It should be appreciated that the predetermined energy threshold may generally be selected so as to correspond to an amount of energy that, in the event that $E_{Total}$ is equal to exceeds the predetermined energy threshold, the reversion action may be performed and the shuttle shift may be completed without causing significant damage (or any damage) to the on-coming directional clutch. For example, in several embodiments, the predetermined energy threshold may be selected based on historical and/or experimentally obtained data relating to the amount of energy that may be dissipated in the on-coming directional clutch without causing damage to the clutch.

As shown in FIG. 14, due to the particular operating parameters of the shuttle shift being performed, $E_{Total}$ is equal to or exceeds the predetermined energy threshold at some point after the travel direction of the work machine has reserved from the off-going direction to the on-coming direction (indicted by point 510). At this point, a reversion action may be performed to prevent any further increase in energy dissipation and to revert the manner of operation of the transmission 10 back to ratio changing. Specifically, at point 510, the controller 100 may be configured to stop increasing the hydraulic pressure within the on-coming directional clutch. Thereafter, the pressure within the on-coming directional clutch may be held substantially constant while the swash plate is moved to a suitable position for fully engaging the on-coming directional clutch. For example, as shown in FIG. 14, the swash plate may be quickly moved in a second direction (indicated by arrow 512 in FIG. 14) opposite the first direction 504 until the amount of slippage across the on-coming directional clutch falls below a predetermined slip threshold (indicted by point 514 in FIG. 14). Such movement of the swash plate may generally reduce the speed differential across the on-coming directional clutch, thereby reducing both the amount of slippage occurring across on-coming directional clutch and the amount of energy dissipated in the clutch.

The remainder of the shuttle shift may then be completed the same as or similar to the shuttle shift described above with reference to FIG. 11. For example, as the slippage across the on-coming directional clutch is reduced beyond the predetermined slip threshold as the swash plate, the swash plate may be slowed and its direction of movement subsequently reversed. Specifically, as shown in FIG. 14, at point 514, the rate of change of the swash plate angle may be slowed and eventually stopped to allow the direction of movement of the swash plate to be reversed from the second direction 512 back to the first direction 504. In addition, at point 514, the pressure within the on-coming directional clutch may begin to be increased. As such, when the slippage across the on-coming directional clutch goes to zero (i.e., when the on-coming directional clutch is fully engaged), the swash plate may be moving in the appropriate direction and at the appropriate rate to allow for a seamless transition. The swash plate may then be moved in the first direction 504 and any necessary range/ratio changes may be made to accelerate the work machine 1 to the desired final speed (indicated by point 516 in FIG. 14).

Referring now to FIG. 15, an example of how the disclosed method 400 may be implemented when the work machine 1 is traveling in the off-going direction is illustrated in accordance with aspects of the present subject matter. As shown, the shuttle shift may be initiated the same as or similar to the shuttle shift described above with reference to FIG. 14. Specifically, after receipt of a shuttle shift command (indicated by point 602 in FIG. 15), the TRR or vehicle speed of the work machine 1 may be reduced by moving the swash plate and making any required range/ratio shifts. For example, as shown in FIG. 15, the swash plate angle may be adjusted in a first direction (indicated by arrow 604 in FIG. 15) to reduce the vehicle speed of the work machine 1. Additionally, as described above, the on-coming directional clutch may be pre-filled with hydraulic fluid while the swash plate angle is being adjusted so that the clutch may begin to be gradually engaged when the TRR reaches the point at which the directional swap is initiated (indicated by point 606 in FIG. 15).

Once the TRR reaches point 606, the directional swap is initiated. For instance, at point 606, the off-going directional clutch (e.g., forward directional clutch 54) may be immediately dumped or disengaged. In addition, the on-coming directional clutch (e.g., reverse directional clutch 52) may be gradually engaged or slipped, thereby allowing the clutch to decelerate the work machine 1 in the off-going direction (indicated by arrow 608 in FIG. 15).

After the initiation of the directional swap, as described above, the controller 100 may be configured to continuously estimate the total amount of energy dissipated during the shuttle shift ($E_{Total}$ from Equation (1) above) and compare each calculated value for $E_{Total}$ to a predetermined energy threshold. If $E_{Total}$ is less than the predetermined energy threshold, the shuttle shift may continue to be performed in the normal manner prescribed for such shuttle shift (e.g., by performing the shuttle shifts according to one of the manners shown in FIGS. 4-9 and 11). However, if $E_{Total}$ is equal to or exceeds the predetermined energy threshold, an appropriate reversion action may be performed to revert the manner of operation of the transmission 10 back to ratio changing. At this point, the reversion action may be performed to revert the manner of operation of the transmission 10 back to ratio changing. Specifically, at point 610, the controller may be configured to immediately disengage the on-coming directional clutch to prevent in any further energy dissipation within the clutch. In addition, at 610, the parking brake 114 may be ramped up or otherwise applied to control the declaration of the work machine 1. Such use of the parking brake 114 may generally allow for the swash plate to be moved to the appropriate position for re-engaging the off-going directional clutch (indicated by point 612 in FIG. 15). For example, as shown in FIG. 15, at 610, the swash plate may be quickly moved in the first direction 604 to allow the off-going directional clutch to be engaged. Once the swash plate is moved to the appropriate position at point 612, the pressure in the off-going directional clutch may be ramped up to the fully engaged pressure so that ratio changing may be used to decelerate the work machine 1.

The remainder of the shuttle shift may then be completed the same as or similar to the shuttle shift described above with reference to FIG. 4. Specifically, after re-engaging the off-going directional clutch, the work machine 1 may be decelerated by adjusting the transmission ratio. As the work machine reaches zero speed (indicated by point 614 in FIG.

15), the off-going directional clutch may be disengaged and the parking brake 114 may be applied to reduce required operator action and to prevent unwanted movements of the work machine 1. The swash plate may then be moved over distance ROM in the second direction (indicated by arrow 616 in FIG. 15) while the on-coming directional clutch is filled. After the swash plate is moved to the correct position and the on-coming directional clutch is engaged, the parking brake 114 may be released or disengaged. The swash plate may then be moved in the first direction 504 and any necessary range/ratio changes may be made to accelerate the work machine 1 to the desired final speed (indicated by point 618 in FIG. 15).

When implementing the shuttle shifts shown in FIGS. 14 and 15, it should be appreciated that the parameter $E_{Dissipated}$ from Equation (1) may generally be determined using any suitable methodology known in the art for estimating the amount of energy dissipated in a slipping clutch. For example, in one embodiment, $E_{Dissipated}$ may be determined using the following equations (Equations (2) and (3)):

$$\text{Power}(t)_{Clutch} = \frac{2 \cdot \pi \cdot \omega(t)_{diff}}{60} \cdot \text{Torque}(t)_{clutch} \quad (2)$$

$$E_{Dissipated} = \sum_{t=o}^{T\_final} \text{Power}(t)_{Clutch} \cdot dt \quad (3)$$

wherein, t corresponds to an instant in time (in seconds) within a time period (dt) between t=0, whereat the directional swap is initiated and the on-coming directional clutch begins to be gradually engaged, and t=T_f final (i.e., the time at which $E_{Dissipated}$ is being calculated by the controller 100), Power(t)$_{Clutch}$ corresponds to the instantaneous power (in Watts) transmitted through the on-coming directional clutch at time t, $\omega(t)_{diff}$ corresponds to the speed differential (in RPM) across the on-coming differential clutch at time t, Torque(t)$_{clutch}$ corresponds to the amount of torque (in N*m) transmitted through the on-coming clutch at time t and dt corresponds to the time period described above. It should be appreciated that Equation (3) may generally provide an approximation of $E_{Dissipated}$, with the accuracy of such approximation increasing as the time period dt is decreased.

It should also be appreciated that the parameters $\omega(t)_{diff}$ and Torque(t)$_{clutch}$ from Equation (2) may be determined by the controller 100 using any suitable means known in the art, such as by directly monitoring the parameters using suitable sensors (e.g., by using speed sensors and/or torque sensors) and/or by calculating the parameters using other monitored parameters of the work machine 1. For instance, the parameter Torque(t)$_{clutch}$ may be calculated as a function of the pressure within the on-coming directional clutch, the number of friction plates within the clutch, the effective friction radius of the friction plates, the coefficient of friction of the friction plates and the area of the clutch piston.

In addition, when implementing the shuttle shifts shown in FIGS. 14 and 15, it should be appreciated that the parameter $E_{Additional}$ from Equation (1) may generally be determined using any suitable methodology known in the art for estimating the amount of energy that will be dissipated in the on-coming directional clutch during the remainder of the shuttle shift. As indicated above, in several embodiments, this additional amount of energy may be estimated by assuming that a reversion action will be performed to complete the shuttle shift. Thus, in the embodiment described above with reference to FIG. 14, $E_{Additional}$ may correspond to the amount of energy dissipated in the on-coming directional clutch as the pressure within the clutch is held constant while the swash plate is moved to a suitable position for engaging the clutch. In such an embodiment, $E_{Additional}$ may be determined using the following equations (Equations (4) and (5)):

$$\text{Power}(t)_{Clutch} = \frac{2 \cdot \pi \cdot \omega(t)_{diff}}{60} \cdot \text{Torque}(t)_{clutch} \quad (4)$$

$$E_{Additional} = \sum_{t=o}^{T\_final} \text{Power}(t)_{Clutch} \cdot dt \quad (5)$$

wherein, t corresponds to an instant in time (in seconds) within the time period (dt) in which the reversion action is being performed (e.g., within the time required to move the swash plate from point 510 to a suitable position for fully engaging the on-coming directional clutch), Power(t)$_{Clutch}$ corresponds to the instantaneous power (in Watts) transmitted through the on-coming directional clutch at time t, $\omega(t)_{diff}$ corresponds to the speed differential (in RPM) across the on-coming differential clutch at time t, Torque(t)$_{clutch}$ corresponds to the amount of torque (N*m) transmitted through the on-coming clutch at time t and dt corresponds to the time period described above.

It should be appreciated that the time period t described above with reference to Equations (4) and (5) may generally correspond to an estimate of the amount of time that will required for the transmission 10 to complete the reversion action. In several embodiments, this estimate may correspond to the amount of time required to complete the reversion action in a worst case scenario. As such, the calculated value for $E_{Additional}$ may be an overestimate of the actual amount of energy that will be dissipated during the reversion action.

Additionally, in several embodiments, $E_{Additional}$ for the shuttle shift shown in FIG. 15 may be estimated in the same manner as that described above. Specifically, the parameter $E_{Additional}$ may be calculated by assuming that the shuttle shift is completed in the manner shown in FIG. 14 (i.e., by holding the pressure within the on-coming directional clutch constant while the swash plate is moved into position to fully engage the clutch) instead of the manner shown in FIG. 15 (i.e., by applying the parking brake while swash plate is moved into position to fully engage the off-going clutch). By doing so, the parameter $E_{Total}$ calculated for the shuttle shift shown in FIG. 15 may be an overestimate of the actual amount of energy dissipated during the shuttle shift, thereby ensuring that the shuttle shift may be completed without overheating or otherwise damaging the on-coming directional clutch. However, in other embodiments, $E_{Additional}$ for the shuttle shift shown in FIG. 15 may be determined using any other suitable methodology (e.g., by assuming that the energy dissipated in the on-coming clutch after point 610 is minimal and setting $E_{Additional}$ to zero).

It should be appreciated that when the parameter $E_{Additional}$ for the shuttle shift shown in FIG. 15 is calculated by assuming that the shuttle shift is completed in the manner shown in FIG. 14, the slip across the on-coming directional clutch is not known and, thus, certain assumptions must be made to allow for the calculation. For example, in one embodiment, it may be assumed that the vehicle speed will not change and that the movement of the swash plate will reduce the slip across the on-coming directional clutch in a linear fashion over time. However, in other embodiments, other assumptions may be made to allow for the slip across the on-coming directional clutch to be estimated.

It should also be appreciated that, as an alternative to estimating the amount of energy required to complete the shuttle shift with a reversion action, $E_{Additional}$ may be estimated by assuming that the shuttle shift is completed normally (i.e., by continuing to slip the on-coming direction clutch instead of reverting back to ratio changing). In such an embodiment, the parameters for Equations (4) and (5) may be adjusted to allow $E_{Additional}$ to be estimated. For instance, the time period t described above with reference to Equations (4) and (5) may correspond to an estimate of the amount of time that will required for the transmission 10 to complete the shuttle shift via clutch slipping.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a continuously variable transmission of a work machine during a shuttle shift, the method comprising:
   initiating a directional swap by disengaging an off-going directional clutch of the continuously variable transmission and slipping an on-coming directional clutch of the continuously variable transmission to decelerate the work machine in an off-going direction;
   estimating a total amount of energy to be dissipated in the on-coming directional clutch during the shuttle shift, including
      estimating an amount of energy that has been previously dissipated in the on-coming directional clutch during the shuttle shift; and
      estimating an amount of additional energy that will be dissipated in the on-coming directional clutch if a reversion action is performed;
   comparing the total amount of energy to a predetermined energy threshold; and
   if the total amount of energy is equal to or exceeds the predetermined energy threshold, performing the reversion action to complete the shuttle shift,
   wherein the reversion action corresponds to an action taken to engage one of the off-going directional clutch or the on-coming directional clutch so as to permit the shuttle shift to be completed using ratio changing.

2. The method of claim 1, wherein estimating an amount of additional energy that will be dissipated in the on-coming directional clutch if the reversion action is performed comprises estimating an amount of energy that will be dissipated in the on-coming directional clutch if a pressure within the on-coming directional clutch is held constant while a swash plate of a hydrostatic unit of the continuously variable transmission is moved to a position for fully engaging the on-coming directional clutch.

3. A method for controlling a continuously variable transmission of a work machine during a shuttle shift, the method comprising:
   initiating a directional swap by disengaging an off-going directional clutch of the continuously variable transmission and slipping an on-coming directional clutch of the continuously variable transmission to decelerate the work machine in an off-going direction;
   estimating a total amount of energy to be dissipated in the on-coming directional clutch during the shuttle shift;
   comparing the total amount of energy to a predetermined energy threshold; and
   if the total amount of energy is equal to or exceeds the predetermined energy threshold, performing a reversion action to complete the shuttle shift, wherein the reversion action corresponds to an action taken to engage one of the off-going directional clutch or the on-coming directional clutch so as to permit the shuttle shift to be completed using ratio changing,
   determining whether the work machine is currently traveling in the off-going direction or in an on-coming direction, and if the work machine is currently traveling in the off-going direction, performing the reversion action to complete the shuttle shift comprises:
      disengaging the on-coming directional clutch;
      re-engaging the off-going directional clutch; and
   adjusting a transmission ratio of the continuously variable transmission to decelerate the work machine in the off-going direction, wherein re-engaging the off-going directional clutch comprises:
      moving a swash plate of a hydrostatic unit of the continuously variable transmission to a position for engaging the off-going directional clutch; and
      applying a parking brake of the continuously variable transmission while the swash plate is moved.

4. The method of claim 3, further comprising:
   moving the swash plate of a hydrostatic unit of the continuously variable transmission to a position for engaging the on-coming directional clutch after a vehicle speed of the work machine is reduced to zero; and
   adjusting the transmission ratio after the on-coming directional clutch is engaged to accelerate the work machine in the on-coming direction.

5. A method for controlling a continuously variable transmission of a work machine during a shuttle shift, the method comprising:
   initiating a directional swap by disengaging an off-going directional clutch of the continuously variable transmission and slipping an on-coming directional clutch of the continuously variable transmission to decelerate the work machine in an off-going direction;
   estimating a total amount of energy to be dissipated in the on-coming directional clutch during the shuttle shift;
   comparing the total amount of energy to a predetermined energy threshold;
   if the total amount of energy is equal to or exceeds the predetermined energy threshold,
   performing a reversion action to complete the shuttle shift, wherein the reversion action corresponds to an action taken to engage one of the off-going directional clutch or the on-coming directional clutch so as to permit the shuttle shift to be completed using ratio changing;
   determining whether the work machine is currently traveling in the off-going direction or in an on-coming direction; and if the work machine is currently traveling in the on-coming direction,
   performing the reversion action to complete the shuttle shift comprising:
      holding a pressure within the on-coming directional clutch constant while a swash plate of a hydrostatic unit of the continuously variable transmission is moved to a position for engaging the on-coming directional clutch; and adjusting a transmission ratio of the continuously variable transmission after the on-coming directional clutch is engaged to accelerate the work machine in the on-coming direction, wherein holding a pressure within the on-coming directional clutch constant while the swash plate of a hydrostatic unit of the continuously variable transmission moves to a position for engaging the on-coming directional clutch comprises:

moving the swash plate in a first direction until slippage across the on-coming directional clutch falls below a pre-determined slip threshold; and moving the swash plate in a second direction after slippage across the on-coming directional clutch falls below the pre-determined slip threshold, the second direction being opposite the first direction.

\* \* \* \* \*